United States Patent
Hida et al.

(10) Patent No.: US 6,904,204 B2
(45) Date of Patent: Jun. 7, 2005

(54) ARRAY WAVEGUIDE DIFFRACTION GRATING TYPE OPTICAL MULTIPLEXER/DEMULTIPLEXER

(75) Inventors: Yasuhiro Hida, Tokyo (JP); Yasuyuki Inoue, Tokyo (JP); Toshiumi Kominato, Tokyo (JP)

(73) Assignees: NTT Electronics Corporation, Tokyo (JP); Nippon Telegraph and Telephone, Tokyo (JP)

( * ) Notice: Subject to any disclaimer, the term of this patent is extended or adjusted under 35 U.S.C. 154(b) by 0 days.

(21) Appl. No.: 10/491,478

(22) PCT Filed: Oct. 9, 2002

(86) PCT No.: PCT/JP02/10479

§ 371 (c)(1),
(2), (4) Date: Apr. 1, 2004

(87) PCT Pub. No.: WO03/036345

PCT Pub. Date: May 1, 2003

(65) Prior Publication Data

US 2004/0247243 A1 Dec. 9, 2004

(30) Foreign Application Priority Data

Oct. 19, 2001 (JP) ........................ 2001-322449

(51) Int. Cl.⁷ ............................ G02B 6/34; G02B 6/27; G02B 6/293
(52) U.S. Cl. .............................. 385/37; 385/11; 385/24
(58) Field of Search .............................. 385/11, 14, 15, 385/24, 37

(56) References Cited

U.S. PATENT DOCUMENTS 5,546,483 A * 8/1996 Inoue et al. .................. 385/14
5,937,113 A * 8/1999 He et al. ...................... 385/11
6,112,000 A * 8/2000 Bergmann et al. ............ 385/47
6,115,514 A * 9/2000 Ando et al. ................... 385/11
2002/0064346 A1 * 5/2002 Kashihara et al. ............ 385/51
2002/0122650 A1   9/2002 Kominato et al.
2002/0181870 A1 * 12/2002 Inoue et al. .................. 385/37

FOREIGN PATENT DOCUMENTS

| JP | 04-241304 | | 8/1992 | |
|---|---|---|---|---|
| JP | 05-157920 | | 6/1993 | |
| JP | 2000241638 A | * | 9/2000 | ............ G02B/6/12 |
| JP | 2000-292634 | | 10/2000 | |
| JP | 2000292634 A | * | 10/2000 | ............ G02B/6/12 |
| JP | 2002-006157 | | 1/2002 | |

OTHER PUBLICATIONS

Inoue et al., "Polarization Mode Converter With Polyimide Half Waveplate in Silica–Based Planar Lightwave Circuits", May 199 IEEE Photonics Technology Letters, vol. 6, No. 5, pp. 626–628.*

(Continued)

Primary Examiner—Michelle R. Connelly-Cushwa
(74) Attorney, Agent, or Firm—Hogan & Hartson, LLP

(57) ABSTRACT

An object of this invention is to cancel a polarization dependence of a transmission center wavelength due to the waveguide birefringence in an array waveguide and a slab waveguide in an array waveguide diffraction grating type optical multiplexer/demultiplexer filter applied for optical communication, particularly, wavelength split multiplexing system. In order to achieve the object of this invention, a polarization mode convertor converts the TE mode in a waveguide to the TM mode and the TM mode to the TE mode. This conversion function makes it possible to cancel the polarization dependence of the transmission center wavelength due to the waveguide birefringence in the array waveguide and the slab waveguide in front of and behind the polarization mode convertor.

8 Claims, 15 Drawing Sheets

OTHER PUBLICATIONS

Spiekman et al., "Design an dRealization of Polarization Independent Phased Array Wavelength Demultiplexers using Differen Array Orders for TE and TM", Jun. 1996, Journal of Lightwave Technology, vol. 14, No. 6, pp. 991–995.*

Nadler et al., "Polarization Insensitive, Low–Loss, Low–Crosstalk Wavelength Multiplexer Modules", Sep./Oct. 1999, IEEE Journal of Selected Topics in Quantum Electronics, vol. 5, No. 5, pp. 1407–1412.*

Wildermuth, et al., Electronics Letters, Aug. 20, 1998, vol. 34, No. 17, pp. 1661–1663.

Abe, et al., The 4$^{th}$ Micro Optics Conference and the 11$^{th}$ Topical Meeting on Grading–index Optical Systems (MOC/GRIN'93) Technical Digest, Oct. 20–22, 1993, pp. 66–69.

Suzuki, et al., Electronics Letters, Jun. 19, 1997, vol. 33, No. 13, pp. 1173–1174.

Inoue, et al., Optical Fiber Communication Conference and Exhibit 2001 (OFC 2001), Mar. 17–22, 2001, pp. WB4–1 and 4–3.

* cited by examiner

· · · · · · · · · ·  TM mode

- - - - - -  TE mode

- · - · - · -  TM mode + TE mode

·········· TM mode

——— TE mode

—·—·— TM mode + TE mode

......... TM mode

------ TE mode

ARRAY WAVEGUIDE DIFFRACTION GRATING TYPE OPTICAL MULTIPLEXER/DEMULTIPLEXER

TECHNICAL FIELD

The present invention is related to an optical multiplexer/demultiplexer applied to optical communication. In particular, the present invention is an optical multiplexer/demultiplexer which carries out multiplexing and demultiplexing of optical signals having different wavelengths in a wavelength division multiplexing system, and is related to a diffraction grating type optical multiplexer/demultiplexer which depends on an array waveguide.

PRIOR ART TECHNOLOGY

An optical multiplexer/demultiplexer which carries out multiplexing or demultiplexing of optical signals having many different wavelengths is an essential requirement in a wavelength division multiplexing system. As for the kind of optical multiplexer/demultiplexer, an array waveguide diffraction grating type optical multiplexer/demultiplexer is mostly used from the point of mass productivity and stability. A description will now be given for a prior art structure of an array waveguide diffraction grating type optical multiplexer/demultiplexer.

A silicon wafer is used as the waveguide substrate of the array waveguide diffraction grating type optical multiplexer/demultiplexer, and quartz glass is used as the waveguide material formed on top of the silicon wafer. There is differential thermal expansion between the silicon of the waveguide substrate and the quartz glass of the waveguide material, and because an internal residual stress is generated in the process of cooling to room temperature from the high temperature at the manufacturing time, a waveguide birefringence of about 0.0002 is created due to the stress inside the array waveguide. This waveguide birefringence makes the transmission center wavelength of the TM mode which has an electric field perpendicular to the substrate shift toward a longer wavelength in comparison with the transmission center wavelength of the TE mode which has an electric field parallel to the substrate. Namely, a wavelength shift is created due to the polarization dependence of the transmission center wavelength. Hereinbelow, the difference between the transmission center wavelength in the TM mode and the transmission center wavelength in the TE mode is called a polarization wavelength shift. This polarization wavelength shift is approximately 0.2 nm in an array waveguide diffraction grating type optical multiplexer/demultiplexer having a 0.4 nm demultiplexing gap.

In the prior art, a method (Japanese Laid-Open Patent Publication No. HEI 4-241304) of carrying out mutual conversion of the TE mode and the TM mode in which a polarization mode converter which depends on a half-wave plate having a main axis inclined at 45 degrees with respect to the substrate is inserted inside the array waveguide is proposed as a method of canceling this polarization shift.

However, in this method, even though the polarization wavelength shift between the center input/output ports can be canceled, strictly speaking the polarization wavelength is different depending on the output port, and the polarization wavelength shift is not canceled at the input/output ports away from the center.

SUMMARY OF THE INVENTION

The structure of an array waveguide diffraction grating type optical multiplexer/demultiplexer will now be described with reference to FIG. 1. FIG. 1 is a schematic view of an array waveguide diffraction grating type optical multiplexer/demultiplexer. In FIG. 1, an input port 12 and an output port 22 are provided on a waveguide substrate 11, and an input channel waveguide 13, an input slab waveguide 14, an array waveguide 15, an output slab waveguide 18, output channel waveguides 21 and output ports 22 are sequentially connected from the input port 12. The output ports 22 have 64 ports from 22-1 to 22-64, and each channel waveguide that forms the output channel waveguides 21 is connected respectively to the output ports 22-1 to 22-64.

The plurality of channel waveguides that form the array waveguide 15 are arranged so that adjacent channel waveguides have path lengths which are different by a prescribed value. The connecting portion of the input channel waveguide 13 and the input slab waveguide 14 and the connecting portion of the array waveguide 15 and the input slab waveguide 14 are arranged on arcs to mutually face each other, and in the same way the connecting portion of the output channel waveguides 21 and the output slab waveguide 18 and the connecting portion of the array waveguide 15 and the output slab waveguide 18 are arranged on arcs to mutually face each other. The fact that phase delay differences of the optical signals due to the path differences of the array waveguide 15 are different depending on the wavelength is utilized, and the optical signals are demultiplex into different output channel waveguides 21 in accordance with each wavelength. As a result, the array waveguide diffraction grating type optical multiplexer/demultiplexer has a wavelength multiplexing/demultiplexing function.

In FIG. 1, a groove 16 formed in the waveguide substrate 11 and a half-wave plate 17 are used for canceling the polarization wavelength shift of the array waveguide 15. The half-wave plate 17 is inserted in the groove 16 so that the main axis is inclined 45 degrees with respect to the waveguide substrate 11. By converting both polarizations of the TE mode and the TM mode with the half-wave plate 17, the polarization wavelength shift of the array waveguide 15 before and after the half-wave plate 17 cancel each other out, whereby the polarization wavelength shift of the array waveguide 15 is canceled.

FIG. 2 is a graph showing the polarization wavelength shift at each output port of an array waveguide diffraction grating type optical multiplexer/demultiplexer which demultiplexes 64 waves with a demultiplexing gap of 0.4 nm. The polarization wavelength shift near the center output port number 32 is about −0.005 nm which almost cancels the polarization dependence, but is approximately −0.03 nm at the output port number 1 and approximately 0.03 nm at the output port number 64 at both ends which forms a polarization wavelength shift of about 10% of the demultiplexing gap. At the output ports of these ends, because the intensity of the optical signals depends on the polarization, this causes the signal quality to be degraded.

The present inventors discovered the causes of different polarization wavelength shifts which depend on the output port number, and the canceling means thereof are described below.

First, from the results of an analysis carried out on the different polarization wavelength shifts which depend on the output port number described above, the cause of these kinds of polarization wavelength shift was discovered to be due to the existence of about a 0.0007 waveguide birefringence in the output slab waveguide 18. In FIG. 3, the focusing state of optical signals having a polarization dependence is shown by light ray paths inside the output slab waveguide 18. In this regard, the polarization dependence of the transmission center wavelength due to the waveguide birefringence in the array waveguide 15 is canceled by the previously mentioned technology.

Because a waveguide birefringence exists in the output slab waveguide 18, the optical signals of the three wavelengths λ1, λ3, λ5 that should be focused to the output ports 1, 3, 5 are focused in the TE mode as shown by the broken lines in the drawing, and focused in the TM mode as shown by the dotted lines in the drawing. Of these, the optical signal of the wavelength λ3 that should be focused to the center output port 3 is focused in the same position in the TE mode and the TM mode without polarization dependence. However, in the optical signals of the wavelength λ1 or the wavelength λ5 that should be focused at the output port 1 or 5 of both sides of the output slab waveguide, it was discovered that the focusing position will shift depending on the polarization mode due to the waveguide birefringence of the output slab waveguide 18, and the amount of this shift becomes larger as the focusing position shifts to the ends. This means that the wavelength of the optical signal focused on a certain output port shifts depending on the polarization, and the size of this polarization wavelength shift becomes larger as the position of the output channel waveguide moves to the ends from the center.

Next, this fact will be described using mathematical equations. As shown in FIG. 3, the focal points of the optical signals are on an arc which joins the connecting portions of the output slab waveguide 18 and the output channel waveguides 21. When x is the distance along the arc from the focal point O at the center output port 3, the focusing position of the optical signal of the wavelength λ is given by:

$$x=(na \times \Delta L - m \times \lambda) \times f/(ns \times d) \quad (1)$$

and the wavelength λ of the optical signal focused at the position where the distance is x from the above equation is given by:

$$\lambda=(na \times \Delta L - ns \times d \times x/f)/m \quad (2)$$

In this case, na is the waveguide refractive index of the array waveguide 15, ns is the waveguide refractive index of the output slab waveguide 18, ΔL is the path length difference of adjacent channel waveguides of the array waveguide 15, m is the diffraction order, f is the focal length of the output slab waveguide 18, and d is the spacing of the array waveguide 15 in the connecting portion with the output slab waveguide 18.

It is understood from Equation (1) that if there is a polarization dependence (birefringence) on the waveguide refractive index of the output slab waveguide 18 and the waveguide refractive index ns(TE) in the TE mode and the waveguide refractive index ns(TM) in the TM mode are different, then the optical signals of the wavelength λ will be focused at different positions respectively in both polarizations. At the same time, it is understood from Equation (2) that if ns(TE) and ns(TM) are different, the wavelength focused at the position of the distance x will be different in both polarizations. Using the difference between the wavelength λ(TE) in the TE mode and the wavelength λ(TM) in the TM mode, the wavelength difference due to this polarization, namely, the polarization wavelength shift Δλ is defined as:

$$\Delta\lambda=\lambda(TM)-\lambda(TE) \quad (3)$$

and this gives:

$$\Delta\lambda=-Bs \times d \times x/(f \times m) \quad (4)$$

In this case, Bs is the waveguide birefringence of the output slab waveguide 18:

$$Bs=ns(TM)-ns(TE) \quad (5)$$

It is understood from Equation (4) that as the demultiplexing number becomes larger and the position of the output waveguide shifts to the ends from the center, the polarization wavelength shift Δλ increases in proportion to the distance x thereof.

In this way, it is possible to elucidate the cause of the polarization wavelength shift which depends on the position of the output port as shown in FIG. 2. This means that the polarization wavelength shift becomes larger as the multiplexing/demultiplexing number of the multiplexer/demultiplexer becomes larger, and this becomes a big problem when the multiplexing/demultiplexing number of the optical multiplexer/demultiplexer is enlarged.

In view of the points described above, it is an object of the present invention to provide an array waveguide diffraction grating type optical multiplexer/demultiplexer which makes it possible to cancel the port dependence of the polarization wavelength shift caused by the waveguide birefringence of the slab waveguide in the array waveguide diffraction grating type optical multiplexer/demultiplexer.

In order to achieve the object stated above, the array waveguide diffraction grating type optical multiplexer/demultiplexer according to a first invention is an array waveguide diffraction grating type optical multiplexer/demultiplexer formed by at least one input channel waveguide, an input slab waveguide connected to said input channel waveguide, an array waveguide formed from a plurality of channel waveguides connected to said input slab waveguide, an output slab waveguide connected to said array waveguide, and at least one output channel waveguide connected to said output slab waveguide on the waveguide substrate, wherein a polarization mode converter is provided in at least one of said input slab waveguide and said output slab waveguide.

In the first invention, a description will be given for an operation which carries out demultiplexing of optical signals having a plurality of wavelengths. The optical signals having a plurality of wavelengths inputted from the input port propagate through the input channel waveguide, and are branched by the input slab waveguide into a plurality of channel waveguides which form the array waveguide. The array waveguide is constructed so that the path length is different between adjacent channel waveguides. The path length difference may be set at a prescribed value, or the path length difference may be set at a value expressed by a function. The connecting portion of the array waveguide and the output slab waveguide and the connecting portion of the output slab waveguide and the output channels are arranged on arcs which mutually face each other. Because the phase delay difference of the optical signals created by the path length difference of the array waveguide is different for each wavelength, the optical signals according to each wavelength are outputted to different output channel waveguides. Namely, an optical demultiplexing function is achieved. However, because a waveguide birefringence exists in this output slab waveguide, the polarization wavelength shift is different between output ports.

For this reason, a polarization mode converter is provided in the output slab waveguide. Namely, the polarization mode converter has a function which converts the TE mode to the TM mode, and the TM mode to the TE mode. As a result, the polarization dependence of the transmission center wavelength created by the waveguide birefringence in the output slab waveguide is canceled before and after the polarization mode converter.

Accordingly, the polarization mode converter provided in the output slab waveguide makes it possible to cancel the polarization dependence of the transmission center wavelength created by the waveguide birefringence existing in the output slab waveguide, and this makes it possible to build an optical demultiplexer which suppresses the output port dependence of the polarization wavelength shift.

Further, with regard to the operation which carries out multiplexing of signals having a plurality of wavelengths in the first invention, it is possible to think of the operation of demultiplexing the signals having a plurality of wavelengths in reverse. The plurality of input ports are connected respectively to corresponding input channel waveguides, and the polarization mode converter is provided in the input slab waveguide connected between the plurality of input channel waveguides and the array waveguide. This polarization mode converter makes it possible to cancel the polarization dependence of the transmission center wavelength created by the waveguide birefringence existing in the input slab waveguide, and this makes it possible to build an optical multiplexer which suppresses the input port dependence of the polarization wavelength shift.

Further, the optical multiplexer/demultiplexer in the first invention which carries out multiplexing of signals having a plurality of wavelengths and demultiplexing of signals having a plurality of wavelengths can be thought of as a combination of an optical multiplexer and an optical demultiplexer. In this case, a polarization mode converter is provided in both the input slab waveguide connected between the plurality of input channel waveguides and the array waveguide, and the output slab waveguide connected between the plurality of output channel waveguides and the array waveguide. These polarization mode converters make it possible to cancel the polarization dependence of the transmission center wavelength due to both the waveguide birefringence existing in the input slab waveguide and the waveguide birefringence existing in the output slab waveguide, and this makes it possible to build an optical multiplexer/demultiplexer which suppresses the input port dependence and the output port dependence of the polarization wavelength shift.

Further, the array waveguide diffraction grating type optical multiplexer/demultiplexer according to the second invention is the optical multiplexer/demultiplexer of the first invention, wherein the array waveguide formed from a plurality of channel waveguides carries out means for canceling the polarization dependence due to the waveguide birefringence.

There is differential thermal expansion between a silicon wafer used as the waveguide substrate and silica-based glass used as the waveguide material formed on the silicon wafer, and this creates waveguide birefringence inside the array waveguide. This generates a polarization wavelength shift in the array waveguide, and because this degrades the signal quality of the optical communication, the second invention is provided with separate means for canceling the polarization dependence of the transmission center wavelength due to the waveguide birefringence of the array waveguide in addition to that of the input slab waveguide or the output slab waveguide. In this way, the polarization mode converters provided in both the input slab waveguide and the output slab waveguide are sufficiently designed to cancel only the polarization dependence of the transmission center wavelength due to the waveguide birefringence of both the input slab waveguide and the output slab waveguide. Further, the polarization mode converter provided in either the input slab waveguide or the output slab waveguide is sufficiently designed to cancel only the polarization dependence of the transmission center wavelength due to the waveguide birefringence of either the input slab waveguide or the output slab waveguide.

Because the second invention cancels the polarization dependence due to the waveguide birefringence of the array waveguide by means separate from the means in the first invention, it is sufficient if only the polarization dependence of the transmission center wavelength due to the waveguide birefringence of both the input slab waveguide and the output slab waveguide, or one of the input slab waveguide or the output slab waveguide is canceled.

Further, the array waveguide diffraction grating type optical multiplexer/demultiplexer according to the third invention is the optical multiplexer/demultiplexer of the first invention, wherein said polarization mode converter forms a means for canceling the polarization dependence due to the waveguide birefringence of said array waveguide, and the polarization dependence due to the waveguide birefringence of at least one of said input slab waveguide and said output slab waveguide.

Because the polarization mode converter provided in both the input slab waveguide and the output slab waveguide, or in one of the input slab waveguide or the output slab waveguide makes it possible to collectively cancel the polarization dependence of the transmission center wavelength due to the waveguide birefringence of the array waveguide in addition to that of the slab waveguides, there is no need to provide the array waveguide with a means for canceling the polarization dependence of the transmission center wavelength due to the waveguide birefringence of the array waveguide.

Accordingly, the third invention makes it possible to build an array waveguide diffraction grating type optical multiplexer/demultiplexer having a simple structure.

Further, the array waveguide diffraction grating type optical multiplexer/demultiplexer according to the fourth invention is the optical multiplexer/demultiplexer of any one of the first, second or third inventions, wherein said polarization mode converter is provided in a common groove formed in said input slab waveguide and said output slab waveguide.

In the case where a polarization mode converter is inserted in both the input slab waveguide and the output slab waveguide, there is the method of forming a groove in each slab waveguide on the waveguide substrate, but in the fourth invention, the groove forming process is simplified by forming one groove in common in the input slab waveguide and the output slab waveguide.

Accordingly, the fourth invention makes it possible to build an array waveguide diffraction grating type optical multiplexer/demultiplexer manufactured by a simplified forming process.

Further, the array waveguide diffraction grating type optical multiplexer/demultiplexer according to the fifth invention is the optical multiplexer/demultiplexer of any one of the first~third inventions, wherein said polarization mode converter is provided in common in said input slab waveguide and said output slab waveguide in an intersecting portion formed by intersecting said input slab waveguide and said output slab waveguide.

In the case where a polarization mode converter is inserted in both the input slab waveguide and the output slab waveguide, there is the method of forming a groove in each slab waveguide on the waveguide substrate, but in the fifth invention, one groove is formed in common in the input slab waveguide and the output slab waveguide, and one common polarization mode converter is provided in said groove in the input slab waveguide and the output slab waveguide. This invention makes it possible to simplify the forming process of the groove and elimination of the polarization mode converter.

Accordingly, the fifth invention makes it possible to build an array waveguide diffraction grating type optical multiplexer/demultiplexer in which the forming process is simplified and the reduction of components is possible.

Further, the array waveguide diffraction grating type optical multiplexer/demultiplexer according to the sixth invention is the optical multiplexer/demultiplexer of any one of the first~fifth inventions, wherein said polarization mode converter is a half-wave plate having a main axis inclined at 45 degrees with respect to said waveguide substrate.

When the half-wave plate is inclined at 45 degrees with respect to said waveguide substrate, the light incident on the half-wave plate forms outgoing light after the TM mode is converted to the TE mode, and the TE mode is converted to the TM mode. As described later, by using a half-wave plate as a polarization mode converter, there is the advantage that it becomes possible to cancel the polarization dependence due to the waveguide birefringence of the array waveguide in addition to the polarization dependence due to the waveguide birefringence of the slab waveguides.

Further, each of these inventions can be combined as mush as possible.

Figure 1:
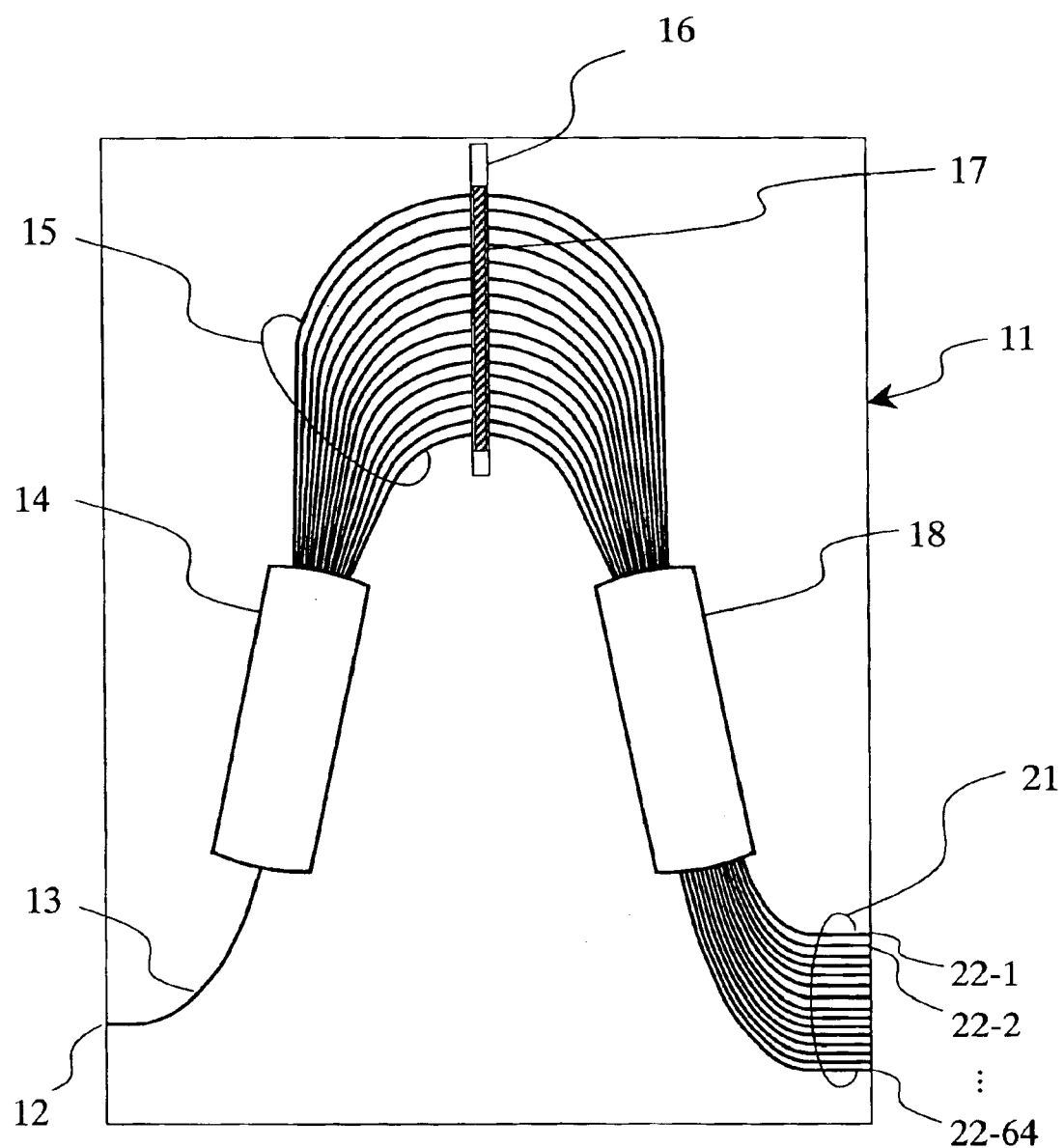
FIG. 1 is a schematic view of an array waveguide diffraction grating type optical multiplexer/demultiplexer.
Figure 2:
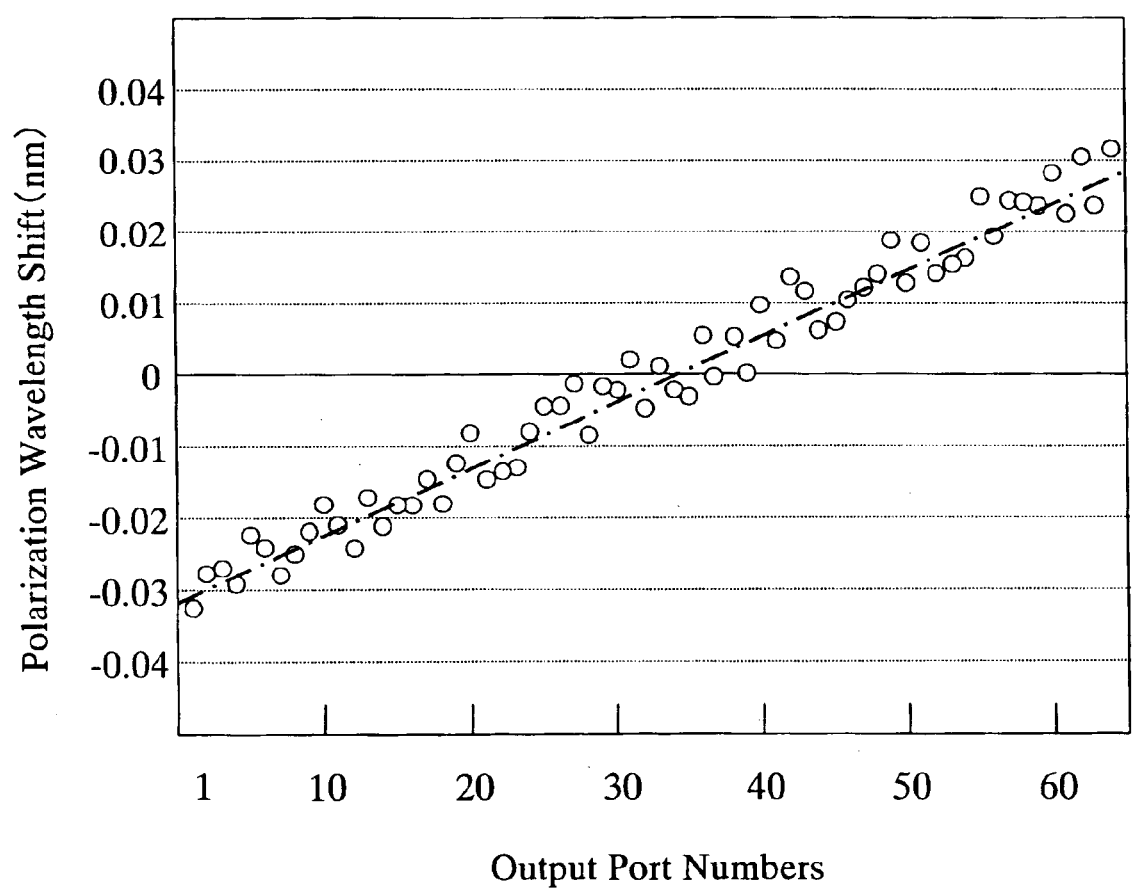
FIG. 2 is a graph showing the polarization wavelength shift at each output port of an array waveguide diffraction grating type optical multiplexer/demultiplexer which demultiplexes 64 waves with a demultiplexing gap of 0.4 nm.
Figure 3:
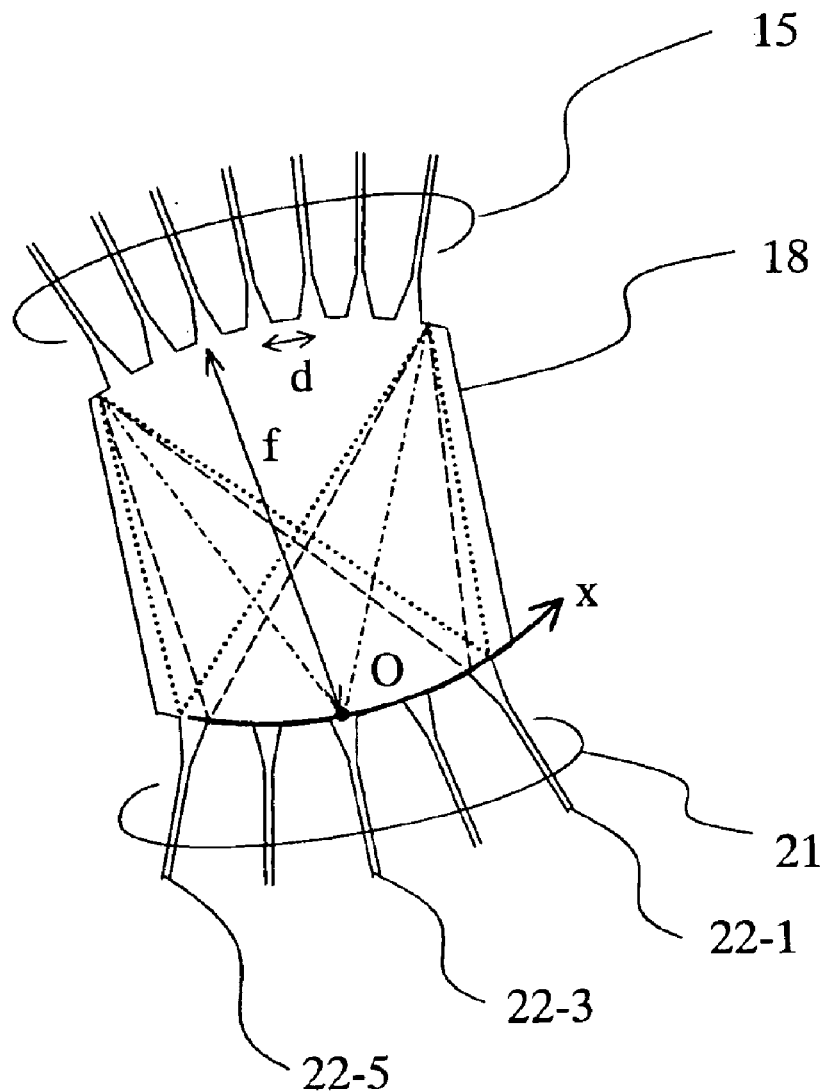
FIG. 3 is a principle drawing for describing the polarization dependence of the focusing characteristics due to the waveguide birefringence of the output slab waveguide in an array waveguide diffraction grating type optical multiplexer/demultiplexer.

A description of the reference characters in the drawings is as follows. 11 is a waveguide substrate, 12, 31-1~31-64, 41-1~41-17 are input ports, 13, 32 are input channel waveguides, 14 is an input slab waveguide, 15, 44 are array waveguides, 16 is a groove, 17 is a half-wave plate, 18 is an output slab waveguide, 19, 33, 42, 51, 53, 55, 58 are grooves, 20, 34, 43, 45, 52, 54, 56, 57, 59 are half-wave plates, 21, 35 are output channel waveguides, 22-1~22-80, 36 are output ports.

PREFERRED EMBODIMENTS OF THE INVENTION

The preferred embodiments of the present invention are described in detail below, but these embodiments are not interpreted as limitations on the present invention.

Embodiment 1

Descriptions of the preferred embodiments of the present invention are given below with reference to the drawings.

Figure 4:
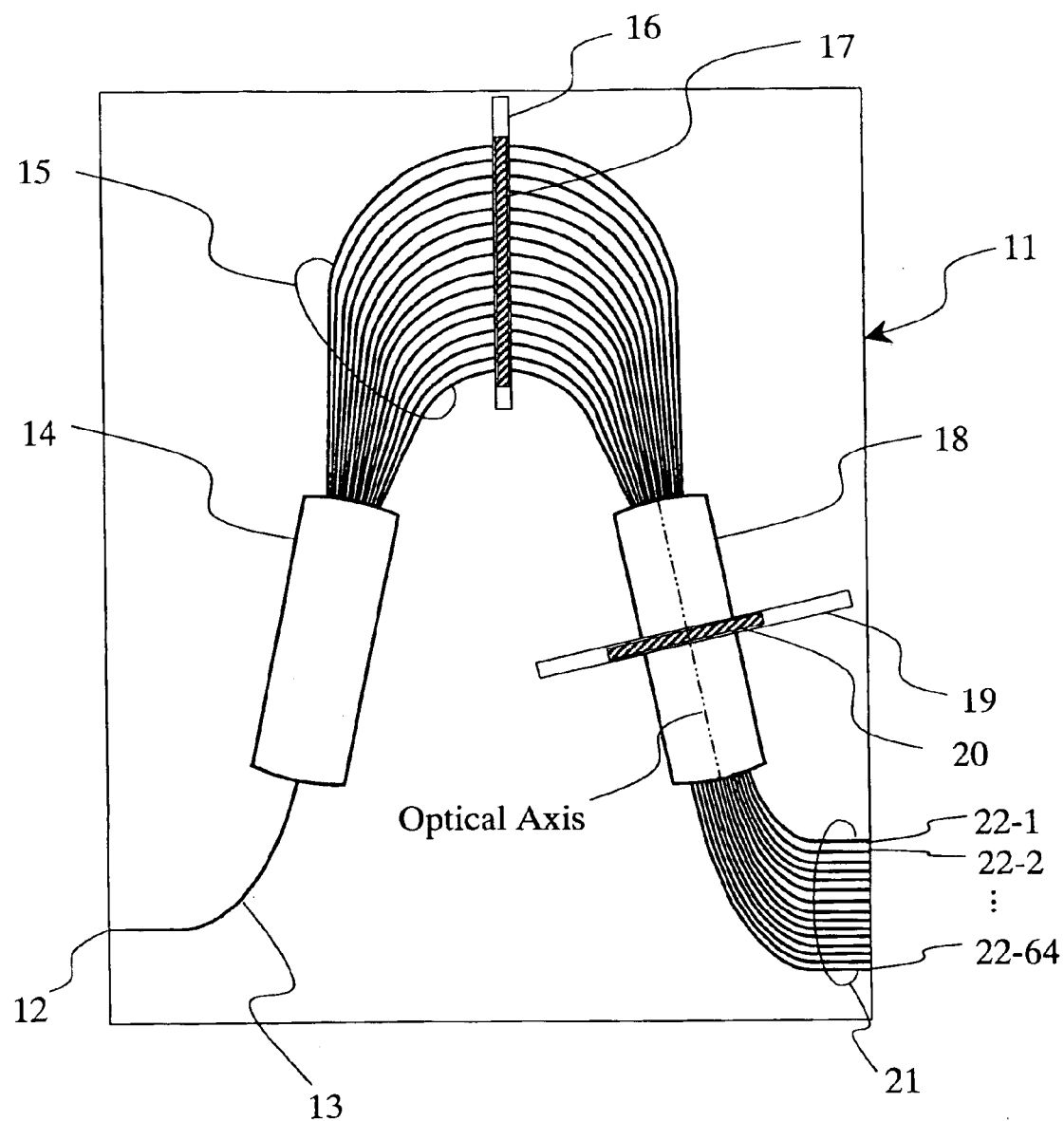
FIG. 4 is a schematic drawing for describing the structure of an array waveguide diffraction grating type optical multiplexer/demultiplexer in which the present invention is applied.

FIG. 4 shows an embodiment of an array waveguide diffraction grating type optical multiplexer/demultiplexer in which the second invention is applied to the first invention. The special feature of the present embodiment is a structure which cancels the polarization dependence of the transmission center wavelength due to the waveguide birefringence of the output slab waveguide by a half-wave plate inserted in the output slab waveguide. A detailed description is given below with reference to the drawings.

As shown in FIG. 4, the present array waveguide diffraction grating is constructed by a silica-based waveguide on top of a waveguide substrate 11 made of silicon, and is formed by an input channel waveguide 13 which is connected to a input port 12, an input slab waveguide 14 which is connected to said input channel waveguide 13, an array waveguide 15 formed from a plurality of channel waveguides which are connected to said input slab waveguide 14, an output slab waveguide 18 which is connected to said array waveguide 15, sixty four output channel waveguides 21 which are connected to said output slab waveguide 18, and sixty four output ports 22 which are connected to said output channel waveguides, whereby an optical multiplexer/demultiplexer having a demultiplexing number of 64 with a demultiplexing gap of 0.4 nm is formed.

As for the means of canceling the polarization dependence of the transmission center wavelength due to the waveguide birefringence of the array waveguide, up to now, the following methods have been disclosed: ① a method in which a groove is formed in both sides of each channel waveguide of the array waveguide to release stress applied to the array waveguide (E. Wildermuth et al.; Electronics Letters, Vol. 34, No. 17, p. 1661, 1998), ② a method in which a thin film of amorphous silicon or the like is formed on the array waveguide to adjust stress (Japanese Laid-Open Patent Publication No. HEI 5-157920), ③ a method in which ultraviolet light is shown on the array waveguide, and the polarization dependence of the refractive index change created thereby is used (M. Abe et al.; The 4th Micro Optics Conference and the 11th Topical Meeting on Gradient-index Optical Systems (MOC/GRIN' 93), Technical Digest, p. 66, 1993), ④ a method in which a polarization mode converter which depends on a half-wave plate having a main axis inclined at 45 degrees with respect to the substrate is inserted inside the array waveguide to convert the TE mode and the TM mode (Japanese Laid-Open Patent Publication No. HEI 4-241304), ⑤ a method in which a material such as germanium, silicon, boron or the like is added to the silica glass of the waveguide material to approach the thermal expansion coefficient of the silicon substrate (S. Suzuki et al.; Electronics Letters, Vol. 33, No. 13, p. 1173), ⑥ a method in which the fact that the waveguide birefringence is different depending on the waveguide width is used, and the width of the array waveguide is changed for each channel waveguide to adjust the polarization dependence (Inoue et al.; Optical Fiber Communication Conference (OFC) 2001, Technical Digest, WB-4, 2001), ⑦ a method in which a birefringence plate is buried in a slab waveguide, and the fact that the focused light beam passing therethrough is shifted depending on the polarization is used to cancel the polarization dependence caused by the waveguide birefringence of the array waveguide (Japanese Laid-Open Patent Publication No. HEI 2000-292634).

Method ④ described above is used in the present embodiment. Namely, a groove 16 having a width of 18 μm and a depth of 200 μm is formed to intersect the middle of the array waveguide 15, and a half-wave plate 17 made of polyimide having a thickness of 15 μm is inserted in the groove 16 with the main axis inclined at 45 degrees with respect to the waveguide substrate 11 to form a polarization mode converter. The polarization dependence of the transmission center wavelength created by the waveguide birefringence of the array waveguide is canceled by this polarization mode converter. This is the same in Embodiment 2.

Next, a groove 19 is formed to intersect approximately the middle of the output slab waveguide 18, and a half-wave plate 20 is inserted in the groove 19 with the main axis inclined at 45 degrees with respect to the waveguide substrate 11 to form a polarization mode converter. In this case, the half-wave plate 20 is made of polyimide and has a thickness of 15 μm, and is inserted and fixed by an adhesive in a groove 19 having a width of 18 μm and a depth of 200 μm processed to intersect perpendicularly with respect to the optical axis of the output slab waveguide 18. Further, optical fibers are connected to the input port 12 and the output ports 22, and these elements are assembled together with essential elements such as a heater, a Peltier element and the like in a casing to form a module, whereby the array waveguide diffraction grating type optical multiplexer/demultiplexer of the present invention is manufactured.

Figure 5:
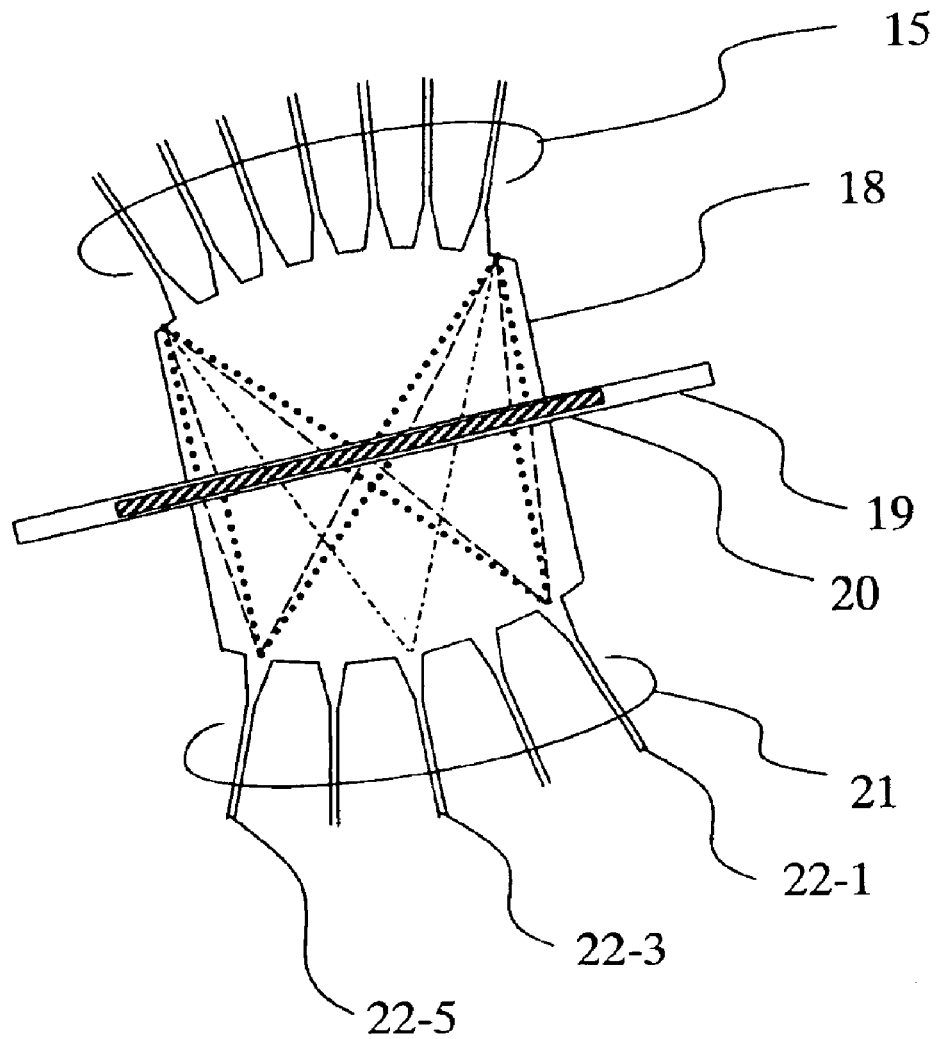
FIG. 5 is a principle drawing for describing the fact that it is possible to cancel the polarization dependence of the focusing characteristics due to the waveguide birefringence of the output slab waveguide by a polarization mode converter in an array waveguide diffraction grating type optical multiplexer/demultiplexer in which the present invention is applied.

FIG. 5 is a drawing showing the state where the output port dependence of the polarization shift is canceled by the polarization mode converter constructed by the half-wave plate 20 made of polyimide inserted in approximately the middle of the output slab waveguide 18 in the array waveguide diffraction grating type optical multiplexer/demultiplexer used in the present invention.

The optical signals of the three wavelengths λ1, λ3, λ5 that should be focused at the output ports 22-1, 22-3, 22-5 receive the effect of the waveguide birefringence of the output slab waveguide 18 in accordance with the polarization of the TE mode and the TM mode at the array waveguide 15 side from the half-wave plate, and focusing is begun as shown by the dashed or dotted lines, respectively. Next, after passing through the polarization mode converter formed from the half-wave plate 20 made of polyimide, the optical signals of the TE mode are converted to the TM mode, and the optical signals of the TM mode are converted to the TE mode, and thereafter each of these receives the opposite waveguide birefringence effect up to that point and propagates. As a result, the optical signals of the TE mode and the TM mode of the wavelengths λ1, λ3, λ5 are finally focused at the same position for each wavelength without relation to the polarization. Namely, the output port dependence of the polarization wavelength shift is canceled by the polarization mode converter provided in the output slab waveguide.

Figure 6:
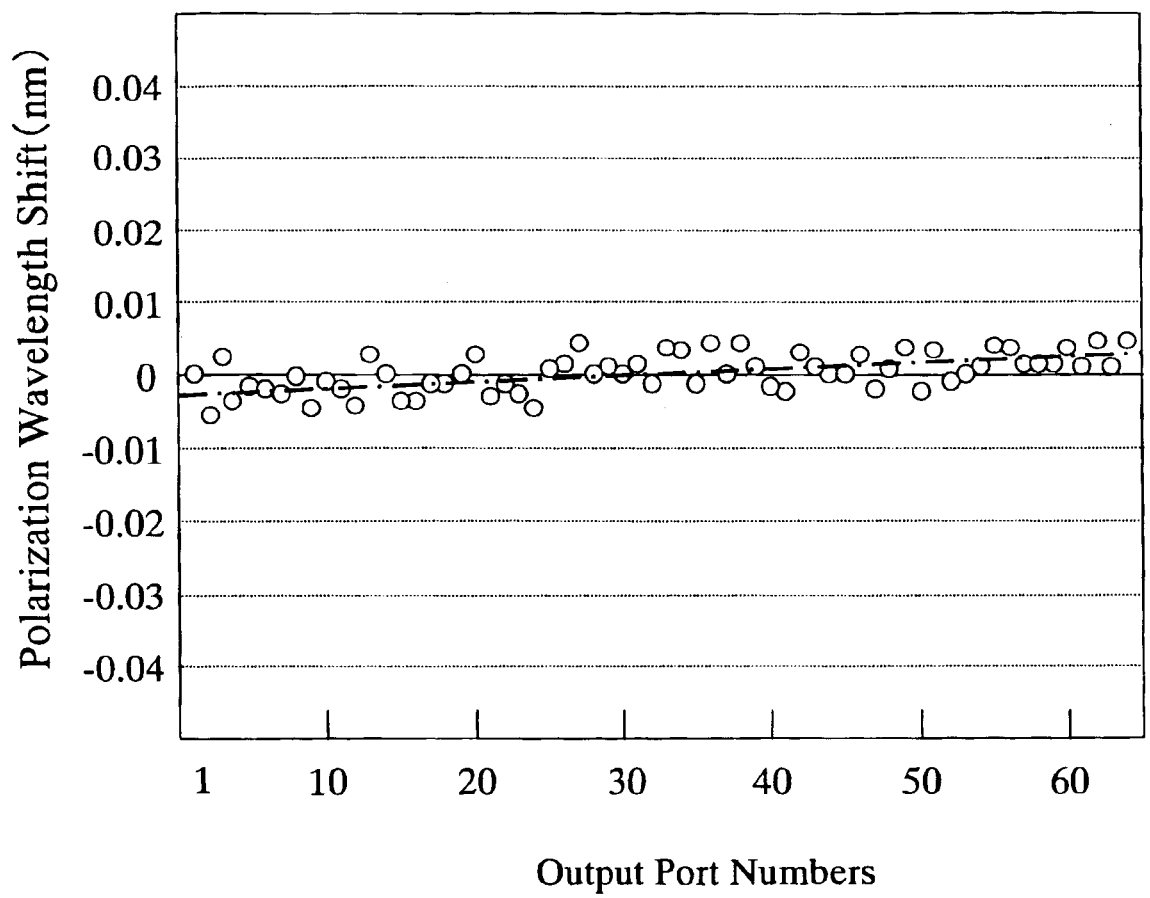
FIG. 6 is a graph of measurement results showing the polarization wavelength shift of each output port in an array waveguide diffraction grating type optical multiplexer/demultiplexer in which the present invention is applied.

The distribution of the polarization wavelength shift among the output ports in the present embodiment is shown in FIG. 6. In FIG. 6, cancellation was carried out up to the point where the polarization wavelength shift among the output ports was approximately zero, and even at the output port number 1 and the output port number 64 at both ends of the output slab waveguide 18, the polarization wavelength shift was reduced to within ±0.005 nm.

From the above, it was understood that the polarization mode converter which depends on the half-wave plate 20 inserted in approximately the middle of the output slab waveguide 18 carries out satisfactory operation in canceling the output port dependence of the polarization wavelength shift, and the array waveguide diffraction grating of the present embodiment achieves satisfactory characteristics as an optical demultiplexer.

The reason a half-wave plate made of polyimide is used in the polarization mode converter inserted in the slab waveguide in the present embodiment is because it is possible to reduce the loss of the signal light due to the insertion of a half-wave plate when the thickness of the half-wave plate is made thin to 20 μm or smaller, and because it is especially suited as a polarization mode converter inserted in a waveguide as in the present embodiment. A polarization mode converter which depends on this half-wave plate made of polyimide is used in the prior art where it is inserted inside the array waveguide to cancel the polarization dependence of the transmission center wavelength due to the waveguide birefringence of the array waveguide, but up to now there is no example of this being applied to cancel the polarization dependence of the transmission center wavelength due to the waveguide birefringence of the slab waveguide, and in the present embodiment it is clear that this functions effectively as a polarization mode converter for canceling the polarization dependence of the transmission center wavelength due to the waveguide birefringence of the slab waveguide, namely, the output port dependence of the polarization wavelength shift.

Embodiment 2

Figure 7:
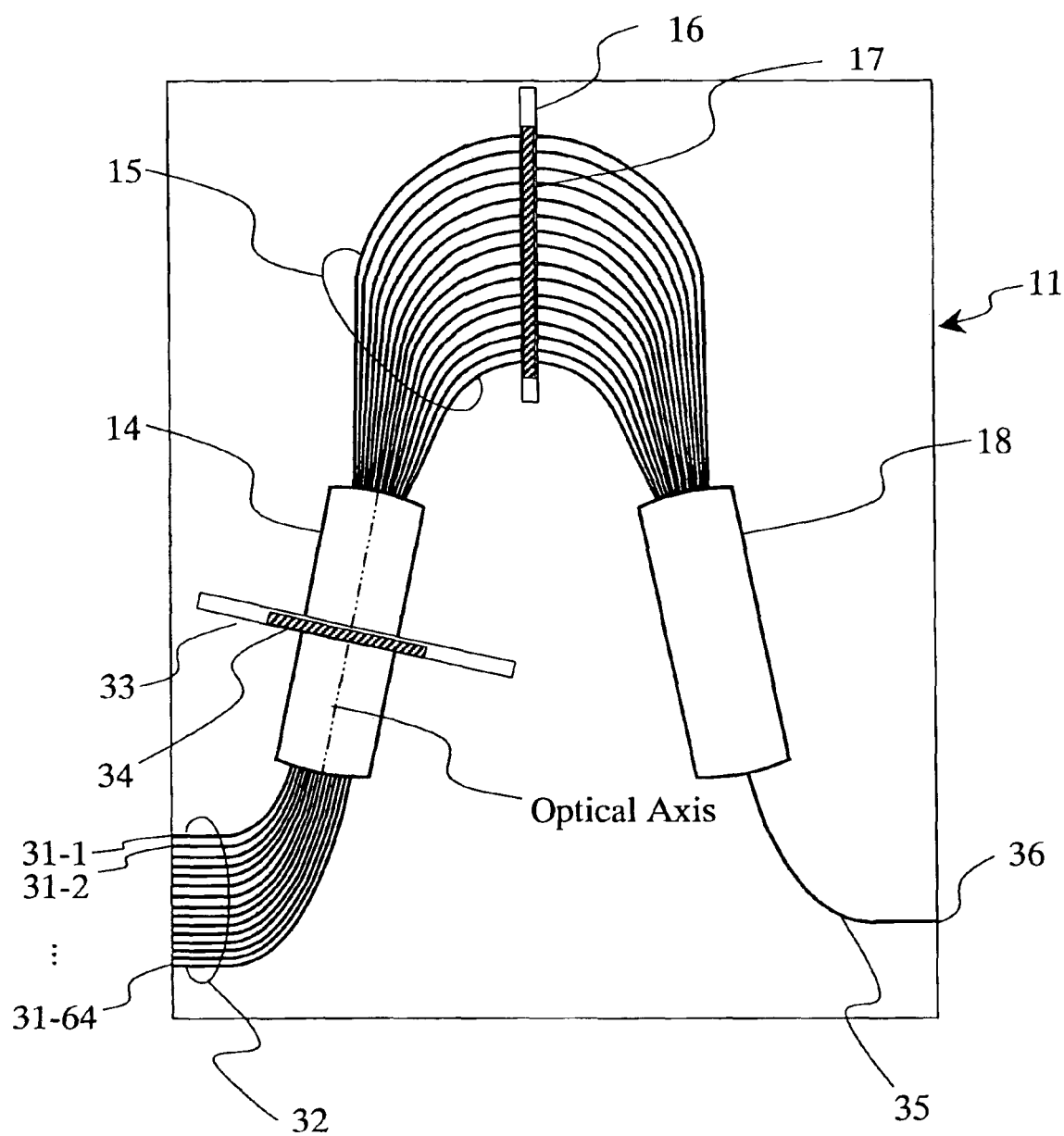
FIG. 7 is a schematic drawing for describing an embodiment of an array waveguide diffraction grating type optical multiplexer/demultiplexer in which the present invention is applied.

FIG. 7 shows a second embodiment of an array waveguide diffraction grating type optical multiplexer/demultiplexer in which the second invention is applied to the first invention. The special feature of the present embodiment is a structure which cancels the polarization dependence of the transmission center wavelength due to the waveguide birefringence of the input slab waveguide by a half-wave plate inserted in the input slab waveguide. A detailed description is given below with reference to the drawings.

As shown in FIG. 7, the present array waveguide diffraction grating is given approximately the same structure as the first embodiment except for the fact that there are sixty four input ports 31 and one output port 36, the fact that a half-wave plate 34 is inserted as a polarization mode converter in the input slab waveguide 14, and the fact that a half-wave plate is not inserted in the output slab waveguide 18.

Because the array waveguide diffraction grating of the present embodiment is given a structure in which the input and the output of the first embodiment are switched, it has a function in which the input and output of the first embodiment are reversed. Namely, the present embodiment functions as an optical multiplexer having a multiplexing gap of 0.4 nm and multiplexing number of 64. The polarization mode converter inserted in the input slab waveguide 14 mutually converts the TE mode and the TM mode in the same way as the polarization mode converter inserted in the output slab waveguide 18 in the first embodiment, and cancels the input port dependence of the polarization wavelength shift caused by the waveguide birefringence of the input slab waveguide 14.

In the present embodiment, a structure in which a half-wave plate 34 made of polyimide having a thickness of 15 μm is inserted in a groove 33 formed in approximately the middle of the input slab waveguide 14 so that the main axis is inclined at 45 degrees with respect to the waveguide substrate 11 is used as a polarization mode converter. The same measurements as those of FIG. 6 were carried out, and from the measurements of the input port dependence of the polarization wavelength shift for the array waveguide diffraction grating type optical multiplexer of the present embodiment, it became clear that the input port dependence of the polarization wavelength shift is almost canceled. Namely, the polarization wavelength shift is within ±0.005 nm for all the input ports, and it is understood that this makes it possible to achieve satisfactory characteristics as an optical multiplexer.

Embodiment 3

Figure 8:
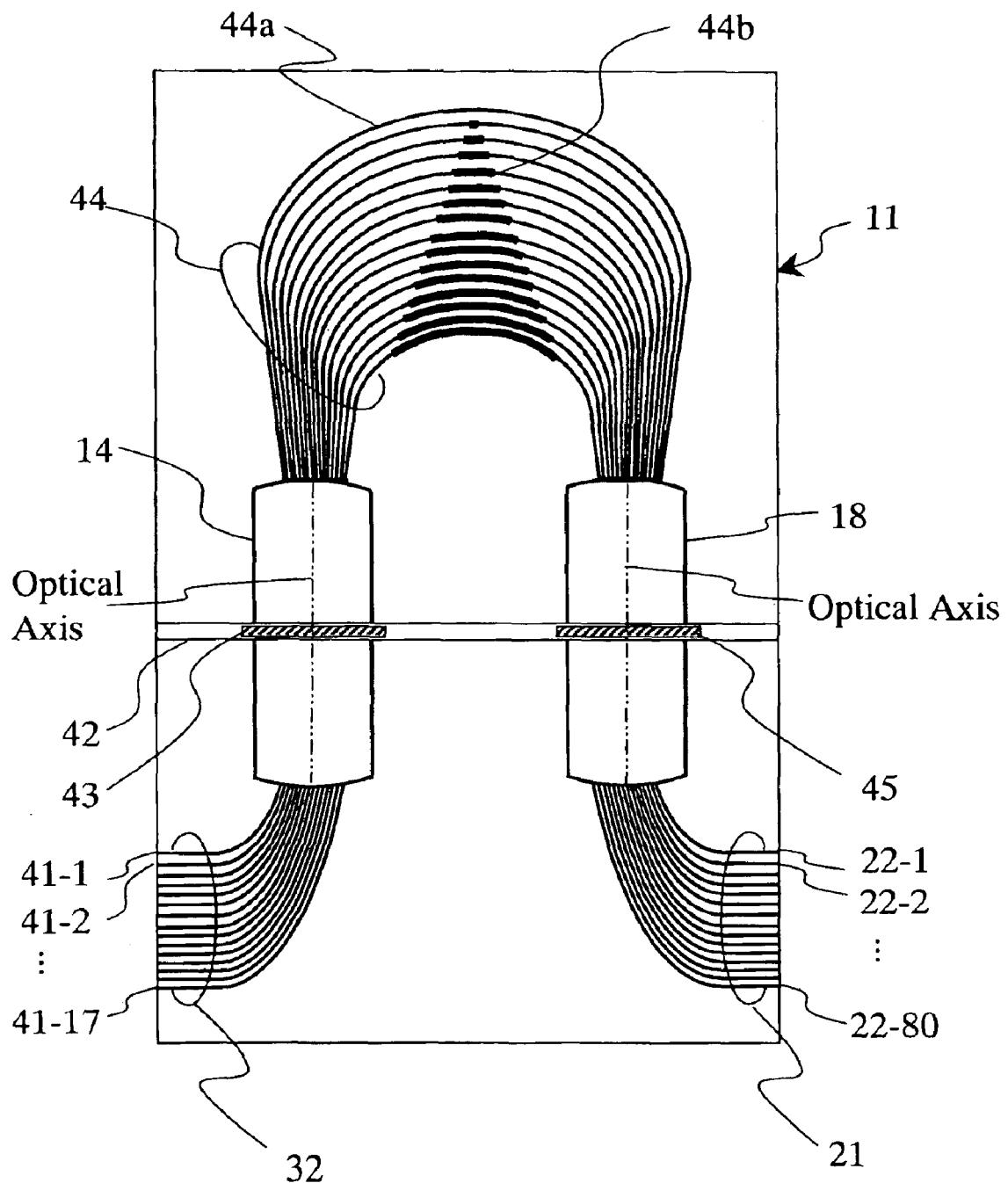
FIG. 8 is a schematic drawing for describing an embodiment of an array waveguide diffraction grating type optical multiplexer/demultiplexer in which the present invention is applied.

FIG. 8 shows an embodiment of an array waveguide diffraction grating type optical multiplexer/demultiplexer in which the fourth invention is applied to the second invention. The special feature of the present embodiment is a structure which cancels the polarization dependence of the transmission center wavelength due to the waveguide birefringence of each of the input slab waveguide and the output slab waveguide by half-wave plates inserted in the input slab waveguide and the output slab waveguide. A detailed description is given below with reference to the drawings.

As shown in FIG. 8, the present array waveguide diffraction grating is an optical demultiplexer having seventeen input ports 41 and eighty output ports 22. The input slab waveguide 14 and the output slab waveguide 18 are arranged in parallel, and a groove 42 having a width of 18 μm and a depth of 200 μm is formed to intersect approximately the middle of both slab waveguides perpendicular to the optical axes thereof. A half-wave plate 43 made of polyimide having a thickness of 15 μm is inserted in the groove 42 at the position intersecting the input slab waveguide so that the main axis is inclined at 45 degrees with respect to the waveguide substrate 11, and a half-wave plate 45 made of polyimide having a thickness of 15 μm is inserted in the groove 42 at the position intersecting the output slab waveguide so that the main axis is inclined at 45 degrees with respect to the waveguide substrate 11, thereby forming each polarization mode converter.

In the present embodiment, the polarization dependence due to the waveguide birefringence of the array waveguide 44 is canceled using Method ⑥ described in the prior art examples. Namely, the array waveguide 44 is constructed by narrow-width channel waveguides 44a having a width of 6 μm and broad-width channel waveguides 44b having a width of 14 μm, wherein the path length of the outside narrow-width channel waveguides 44a become long, and the path length of the inside broad-width channel waveguides 44b become long.

Further, the plurality of input ports 41-1 through 41-17 in the present embodiment have a function which makes it possible to carry out fine adjustment of the transmission center wavelength of optical signals in accordance with such input ports, and for that purpose the gap of the input channel waveguides 32 connected to the input slab waveguide 14 is made slightly wider than the gap of the output channel waveguide 21 connected to the output slab waveguide 18 (Japanese Laid-Open Patent Publication No. HEI 8-211237). The output ports 22-17 to 22-80 correspond to the input port 41-1, and this functions as an optical demultiplexer having a demultiplexing gap of 0.4 nm and a demultiplexing number of 64. The output ports 22-16 to 22-79 correspond to the input port 41-2, and in the same way on downward, the output ports 22-1 to 22-64 correspond to the input port 41-17. By selecting the input ports from this port arrangement, it is possible to carry out fine adjustment of the transmission center wavelength of the demultiplexed optical signals by increments of 0.025 nm.

In an array waveguide having a plurality of both input ports and output ports like that of the present structure, the polarization wavelength shift of the demultiplexed optical signals depend on each of the input ports and the output ports due to the effect of the waveguide birefringence of the input slab waveguide 14 and the output slab waveguide 18. Accordingly, in the array waveguide diffraction grating of the present embodiment, the common groove 42 is formed in approximately the middle of each of the input slab waveguide 14 and the output slab waveguide 18, and polarization mode converters which depend on the half-wave plates 43, 45 made of polyimide and having a thickness of 15 μm are inserted respectively in the groove 42 so that the main axes are inclined at 45 degrees with respect to the waveguide substrate 11, and this canceled the polarization dependence of the transmission center wavelength caused by the waveguide birefringence of the input slab waveguide 14 and the output slab waveguide 18.

The same measurements as those of FIG. 6 were carried out for the array waveguide diffraction grating type optical demultiplexer of the present embodiment, and the port dependence of the polarization wavelength shift was measured at each of the input ports and the output ports. As a result, the port dependence of the polarization wavelength shift was approximately even and the polarization wavelength shift was suppressed to within ±0.005 nm for all the input ports.

From the above, it was confirmed that the array waveguide diffraction grating type optical demultiplexer of the present embodiment operates as an optical demultiplexer which makes it possible to carry out fine adjustment of the demultiplexing wavelength without polarization dependence of the transmission center wavelength.

As for the method of canceling the polarization dependence due to the waveguide birefringence of the array waveguide 44, the array waveguide diffraction grating was manufactured by silica-based glass in which doping with germanium, silicon or boron was carried out above a double of the normal level in accordance with Method ⑤ described in the prior art examples of the Embodiment 1, and this made it possible to cancel the waveguide birefringence of the array waveguide. In this array waveguide diffraction grating, it was understood that a waveguide birefringence of about 0.0004 nm was created in the slab waveguides, and a polarization wavelength shift was created in the output ports away from the center. Even in this array waveguide diffraction grating, it was confirmed that the output port dependence of the polarization wavelength shift in the slab waveguides was canceled by the polarization mode converters provided in the slab waveguides described in the first through third embodiments.

Embodiment 4

Figure 9:
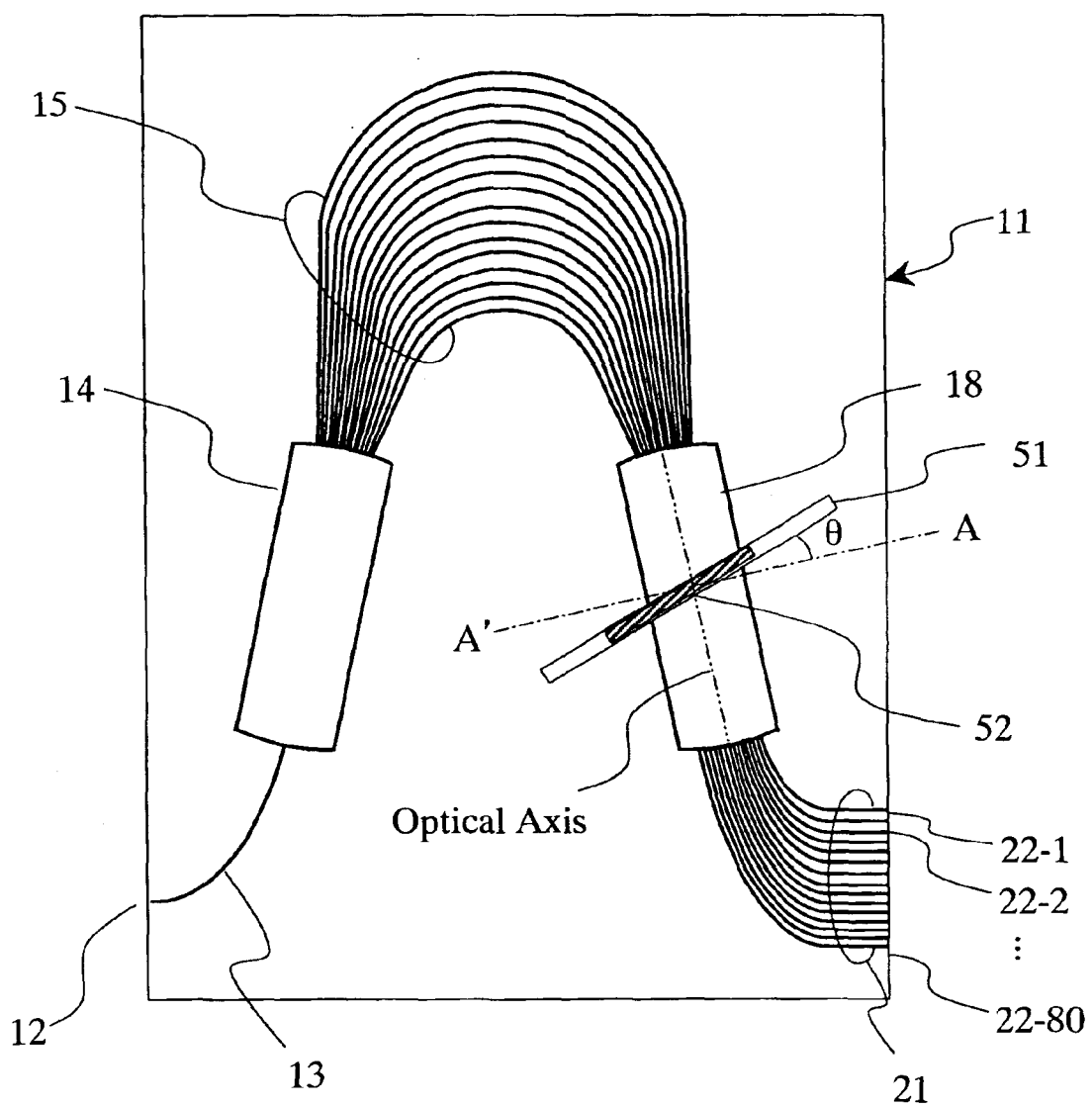
FIG. 9 is a schematic drawing for describing an embodiment of an array waveguide diffraction grating type optical multiplexer/demultiplexer in which the present invention is applied.

FIG. 9 shows an embodiment of an array waveguide diffraction grating type optical multiplexer/demultiplexer according to the third invention. The special feature of the present embodiment is a structure which also cancels the polarization dependence of the transmission center wavelength due to the waveguide birefringence of the array waveguide in addition to that of the output slab waveguide by a half-wave plate inserted in the output slab waveguide. A detailed description is given below with reference to the drawings.

As shown in FIG. 9, the present array waveguide diffraction grating is given approximately the same structure as that of FIG. 4 except for the fact that there is no groove and half-wave plate in the array waveguide 15 and the fact that a groove 51 is formed in the output slab waveguide 18 at an incline with respect to the optical axis thereof and a half-wave plate 52 is inserted in the groove 51. Further, in the same way as in the embodiment of FIG. 4, the half-wave plate 52 is made of polyimide and has a thickness of 15 μm, and is inserted and fixed by an adhesive in the groove 51 having a width of 18 μm and a depth of 200 μm which obliquely intersects approximately the middle of the output slab waveguide 18 so that the main axis is inclined at 45 degrees with respect to the waveguide substrate 11.

Figure 10:
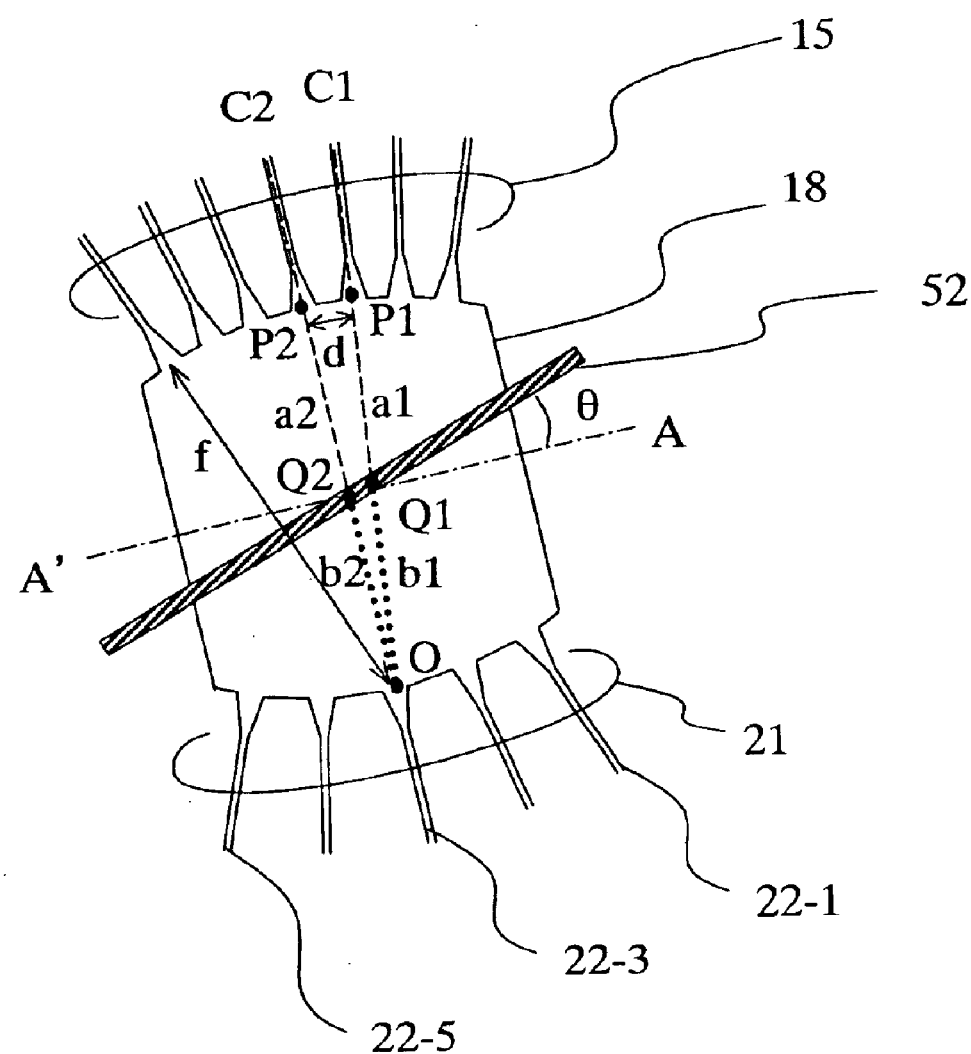
FIG. 10 is a principle drawing for describing the fact that it is possible to cancel the polarization dependence of the focusing characteristics due to the waveguide birefringence of the output slab waveguide and the array waveguide by a polarization mode converter provided in the output slab waveguide in an array waveguide diffraction grating type optical multiplexer/demultiplexer in which the present invention is applied.

By properly selecting the angle θ formed between the groove 51 and a line A–A' which is perpendicular to the optical axis of the output slab waveguide 18, it is possible to collectively cancel the polarization dependence of the transmission center wavelength due to the waveguide birefringence of both the slab waveguide and the array waveguide. The method of calculating the incline angle θ will be described with reference to FIG. 10. As shown in FIG. 10, the array waveguide 15 is constructed by many channel waveguides, and the conditions for carrying out interference and focusing inside the output slab waveguide 18 must be satisfied even between two channel waveguides. In this regard, a description can be given using the two center channel waveguides. FIG. 10 shows the state where the optical signals propagated in the TE mode through the two mutually adjacent center channel waveguides C1, C2 of the array waveguide 15 are emitted respectively in the output slab waveguide 18 having a focal length f at the connecting points P1, P2 separated by a distance d, and are propagated the distances a1, a2 in the TE mode to the half-wave plate 52 where conversion to the TM mode is carried out at the points Q1, Q2, and then are propagated the distances b1, b2 and focused at the point O on the center output port 22-3. The channel waveguide C1 is positioned outside from the center of the array waveguide 15 more than C2, and C1 is longer than C2 by the path length difference ΔL.

If the difference of the optical path length (path length× refractive index) of the optical signals propagating respectively through these two paths C1-P1-Q1-O and C2-P2-Q2-O is an integer m multiple of the wavelength λ(TE), because the optical signals will interfere and be focused at the point O, in the TE mode this gives the following:

$$\{na(TE)\cdot\Delta L+ns(TE)\cdot a1+ns(TM)\cdot b1\}-\{ns(TE)\cdot a2+ns(TM)\cdot b2\}= m\cdot\lambda(TE) \quad (6)$$

In the same way, in the case of the optical signals propagated through C1, C2 in the TM mode, the wavelength is λ(TM), and this gives the following:

$$\{na(TM)\cdot\Delta L+ns(TM)\cdot a1+ns(TE)\cdot b1\}-\{ns(TM)\cdot a2+ns(TE)\cdot b2\}= m\cdot\lambda(TM) \quad (7)$$

and the optical signals interfere and are focused at the point O. From these two equations, when the conditions for making λ(TE)=λ(TM) to cancel the polarization dependence of the transmission center wavelength are calculated, this gives the following:

$$b1-b2=Ba\cdot\Delta L/(2Bs) \quad (8)$$

In this case, Ba is the waveguide birefringence of the array waveguide 15, which is given by the following:

$$Ba=na(TM)-na(TE) \quad (9)$$

and Bs is the waveguide birefringence of the output slab waveguide 18 given by Equation (5) described above. Further, the left side of Equation (8) can be expressed using the incline angle θ of the half-wave plate 52 from geometric calculations, which gives the following:

$$b1-b2=d\cdot\tan(\theta)/2 \quad (10)$$

In this case, an approximation is generally used based on the fact that the distance d between the two connecting points P1, P2 is sufficiently smaller than the focal length f of the slab waveguide 18. As a result, from Equation (8) and Equation (10), the incline angle θ can be calculated by the following:

$$\theta=\tan^{-1}\{Ba\cdot\Delta L/(Bs\cdot d)\} \quad (11)$$

In this case, the positive direction of θ is the rotation of the half-wave plate 52 in the counterclockwise direction in FIG. 9.

The method of inserting this wave plate at an incline in the slab waveguide to also cancel the polarization dependence of the transmission center wavelength due to the waveguide birefringence of the array waveguide is applied to an optical demultiplexer having a demultiplexing gap of 0.8 nm and a demultiplexing number of 64. In the array waveguide diffraction grating of the present embodiment, the demultiplexing gap is twice that of the previous embodiments, and the wavelength band required for demultiplexing is also twice as wide. In order to obtain these demultiplexing characteristics, the path length difference ΔL of the array waveguide 15 is made 16 μm, and the gap d of the array waveguide 15 is made 15 μm at the connecting portion with the output slab waveguide 18.

Figure 11:
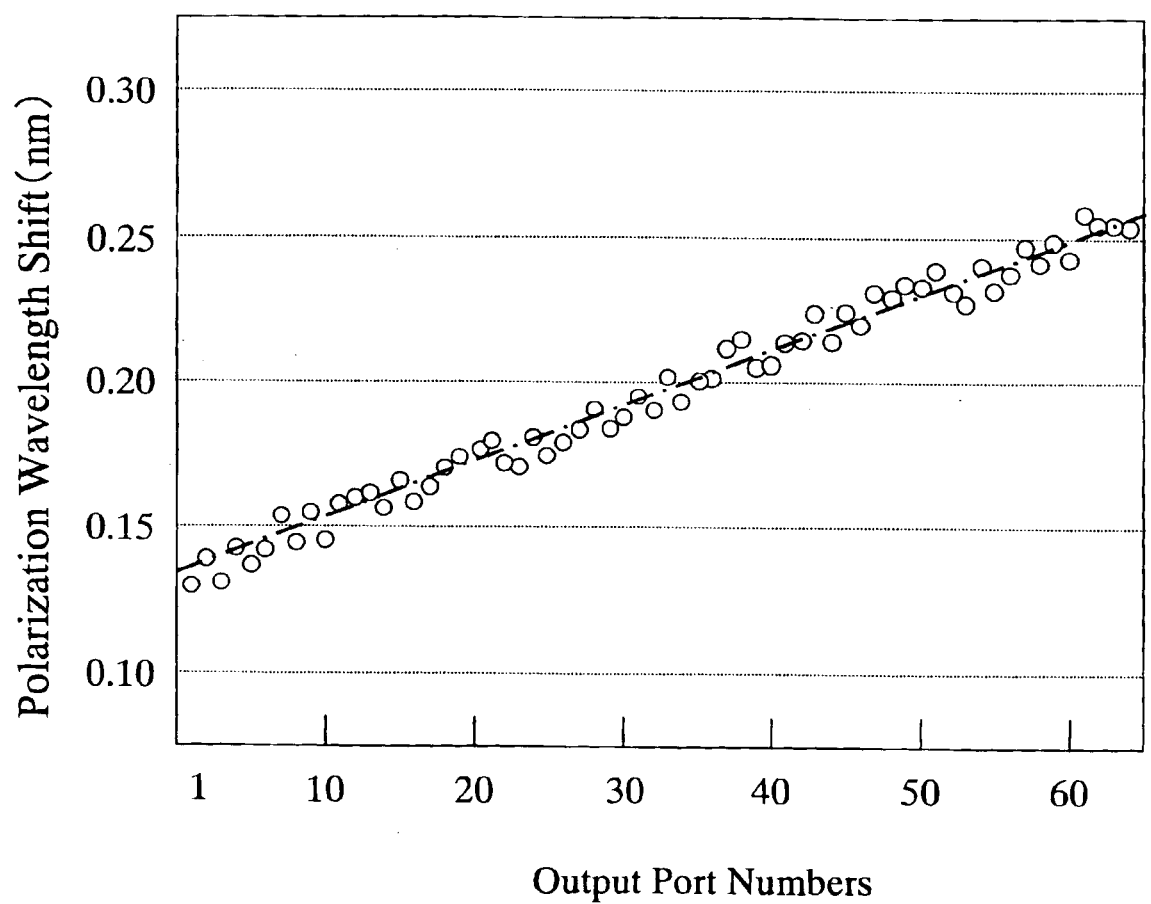
FIG. 11 is a graph of measurement results showing the polarization wavelength shift of each output port in an array waveguide diffraction grating type optical multiplexer/demultiplexer before the present invention is applied.

The results of measurements of the output port dependence of the polarization wavelength shift when the half-wave plate 52 is not inserted are shown in FIG. 11. There is a polarization wavelength shift of 0.2 nm even near the center output port number 32 due to the waveguide birefringence Ba of the array waveguide 15, and it was understood that the polarization wavelength shift due to the waveguide birefringence Bs of the output slab waveguide 18 increases approximately in proportion to the output port number. From these results, each waveguide birefringence was calculated respectively to give Ba=0.0004, Bs=0.0007. Accordingly, when the incline angle θ of the half-wave plate 52 required for canceling these polarization dependences was calculated from Equation (11), this gave θ=31 degrees.

Figure 12:
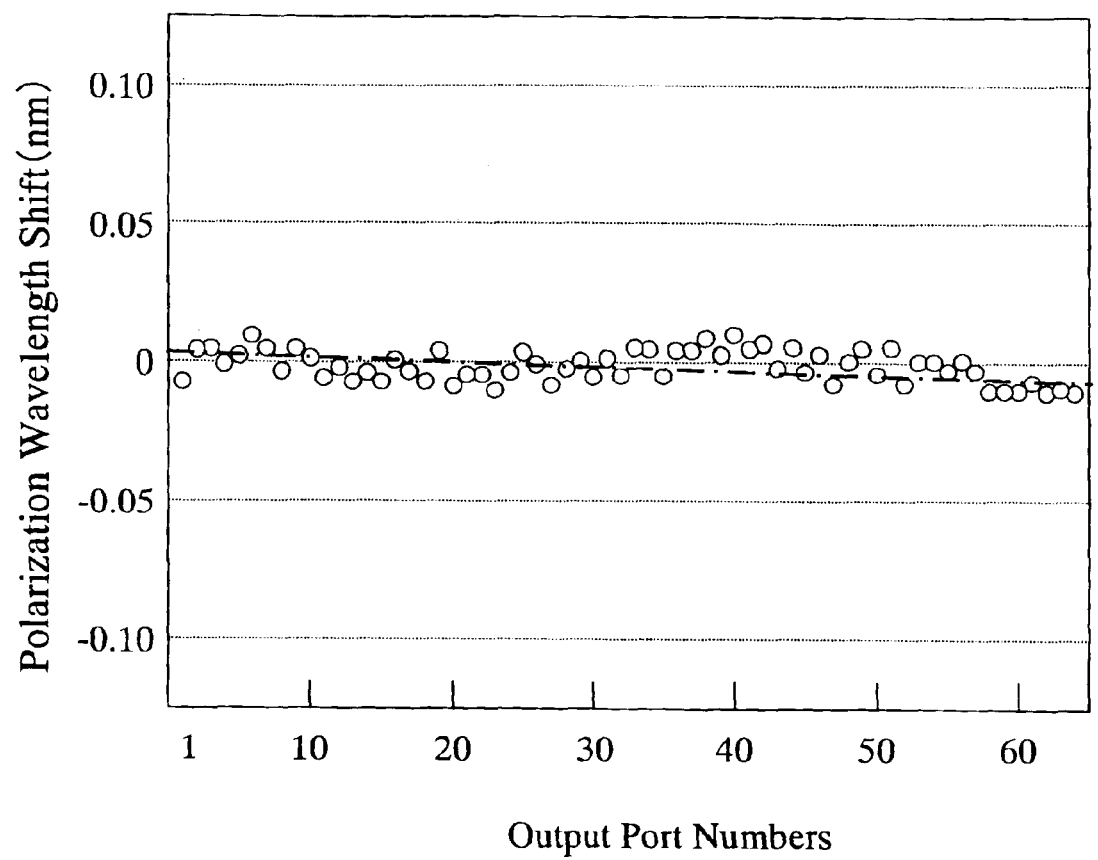
FIG. 12 is a graph of measurement results showing the polarization wavelength shift of each output port in an array waveguide diffraction grating type optical multiplexer/demultiplexer in which the present invention is applied.

Next, the groove 51 was formed through the middle of the output slab waveguide 18 at an incline of only 31 degrees counterclockwise from the line AA' which is perpendicular to the optical axis of the output slab waveguide 18. A polarization mode converter was constructed by inserting the half-wave plate 52 in the groove 51. FIG. 12 shows the results of measurements of the output port dependence of the polarization wavelength shift after the insertion of the half-wave plate 52. It was understood that it was possible to suppress the polarization wavelength shift to within ±0.01 nm for all the output ports by the insertion of the half-wave plate 52.

From the above, it was confirmed that it is possible to cancel the polarization dependence of the transmission center wavelength due to the waveguide birefringence of the array waveguide in addition to that of the output slab waveguide by the half-wave plate inserted in the output slab waveguide in the array waveguide diffraction grating type optical demultiplexer of the present embodiment.

Embodiment 5

Figure 13:
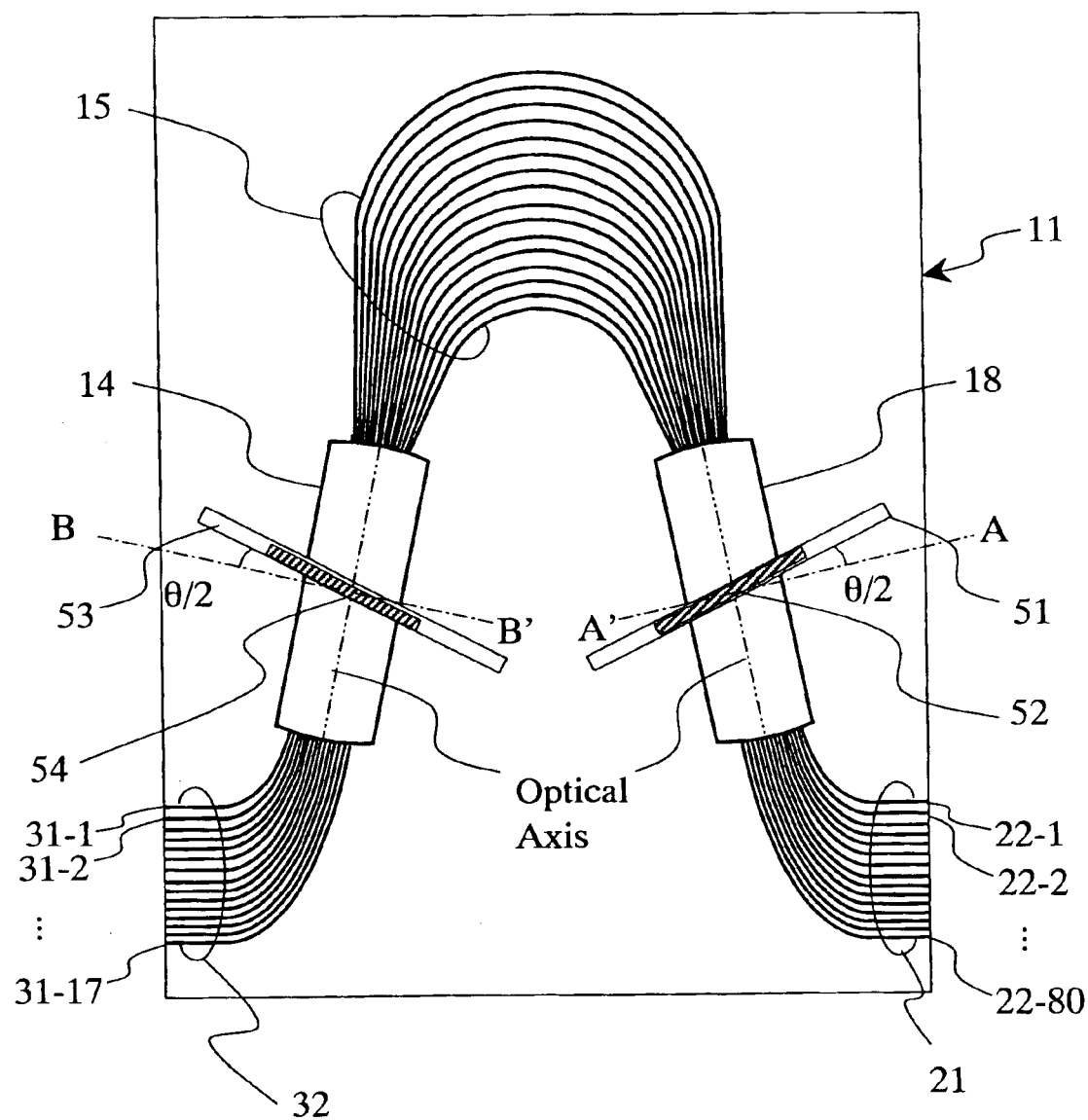
FIG. 13 is a schematic drawing for describing an embodiment of an array waveguide diffraction grating type optical multiplexer/demultiplexer in which the present invention is applied.

FIG. 13 shows another embodiment of an array waveguide diffraction grating type optical multiplexer/demultiplexer according to the third invention. The special feature of the present embodiment is a structure which also cancels the polarization dependence of the transmission center wavelength due to the waveguide birefringence of the array waveguide in addition to those of the input slab waveguide and the output slab waveguide by half-wave plates inserted in the input slab waveguide and the output slab waveguide. A detailed description is given below with reference to the drawings.

As shown in FIG. 13, the present array waveguide diffraction grating is given approximately the same structure as that of FIG. 9 except for the fact that there are many input ports and the fact that a groove 53 is formed in the input slab waveguide 14 at an incline with respect to the optical axis thereof and a half-wave plate 54 is inserted in the groove 53.

In the same way as in the embodiment of FIG. 8, the present array waveguide diffraction grating is an optical multiplexer/demultiplexer having seventeen input ports 31 and eighty output ports 22. The plurality of input channel waveguides 32 in the present embodiment have a function which makes it possible to carry out fine adjustment of the transmission center wavelength of optical signals in accordance with the input ports thereof, and for that purpose the gap of the input channel waveguides 32 connected to the input slab waveguide 14 is made slightly wider than the gap of the output channel waveguide 21 connected to the output slab waveguide 18. The output ports 22-17 to 22-80 are used for the input port 31-1, and this functions as an optical demultiplexer having a demultiplexing gap of 0.8 nm and a demultiplexing number of 64. The output ports 22-16 to 22-79 correspond to the input port 31-2, and in the same way on downward, the output ports 22-1 to 22-64 correspond to the input port 17. This makes it possible to carry out fine adjustment of the transmission center wavelength of the optical signals demultiplexed between adjacent input ports by increments of 0.05 nm. In the present embodiment, in the same way as in the Embodiment 4, the path length difference ΔL of the array waveguide 15 is made 16 μm, and the gap d of the array waveguide 15 is made 15 μm at both the connecting portion between the array waveguide 15 and the input slab waveguide 14, and the connecting portion with the output slab waveguide 18.

The input port dependence and the output port dependence of the polarization wavelength shift before insertion of the half-wave plates 52, 54 in the array waveguide diffraction grating of the present embodiment were measured, and this gave a distribution similar to that of FIG. 11. As a result, it was understood that the waveguide birefringence Ba was 0.0004 in the array waveguide 15, and the waveguide birefringence Bs was 0.0007 in both the input slab waveguide 14 and the output slab waveguide 18. Then, grooves 51, 53 having a width of 18 μm and a depth of 200 μm were respectively formed in approximately the middle of the input slab waveguide 14 and the output slab waveguide 18 at inclines of only the angle θ/2 with respect to the lines AA', BB' which are perpendicular to the optical axis of each slab waveguide. In this case, the positive direction of θ is the clockwise direction in the input slab waveguide 14, and the counterclockwise direction in the output slab waveguide 18. The half-wave plate 52 made of polyimide is inserted into the groove 51, and the half-wave plate 54 made of polyimide is inserted into the groove 53 to construct polarization mode converters. The reason why the incline angles of the half-wave plates 52, 54 become half of the calculated angle θ described in Embodiment 4 is because both half-wave plates 52, 54 cooperate to compensate the polarization dependence of the transmission center wavelength due to the waveguide birefringence of the array waveguide 15, and it is sufficient if the sum of the incline angles of the half-wave plates form θ given by Equation (11). The input port dependence and the output port dependence of the polarization wavelength shift of the array waveguide diffraction grating of the present embodiment were measured, and the polarization wavelength shift was reduced to within ±0.01 nm for all the input ports.

From the above, it was confirmed that the array waveguide diffraction grating of the present embodiment operates as an optical demultiplexer which makes it possible to carry out fine adjustment of the demultiplexing wavelength without polarization dependence of the transmission center wavelength.

Embodiment 6

Figure 14:
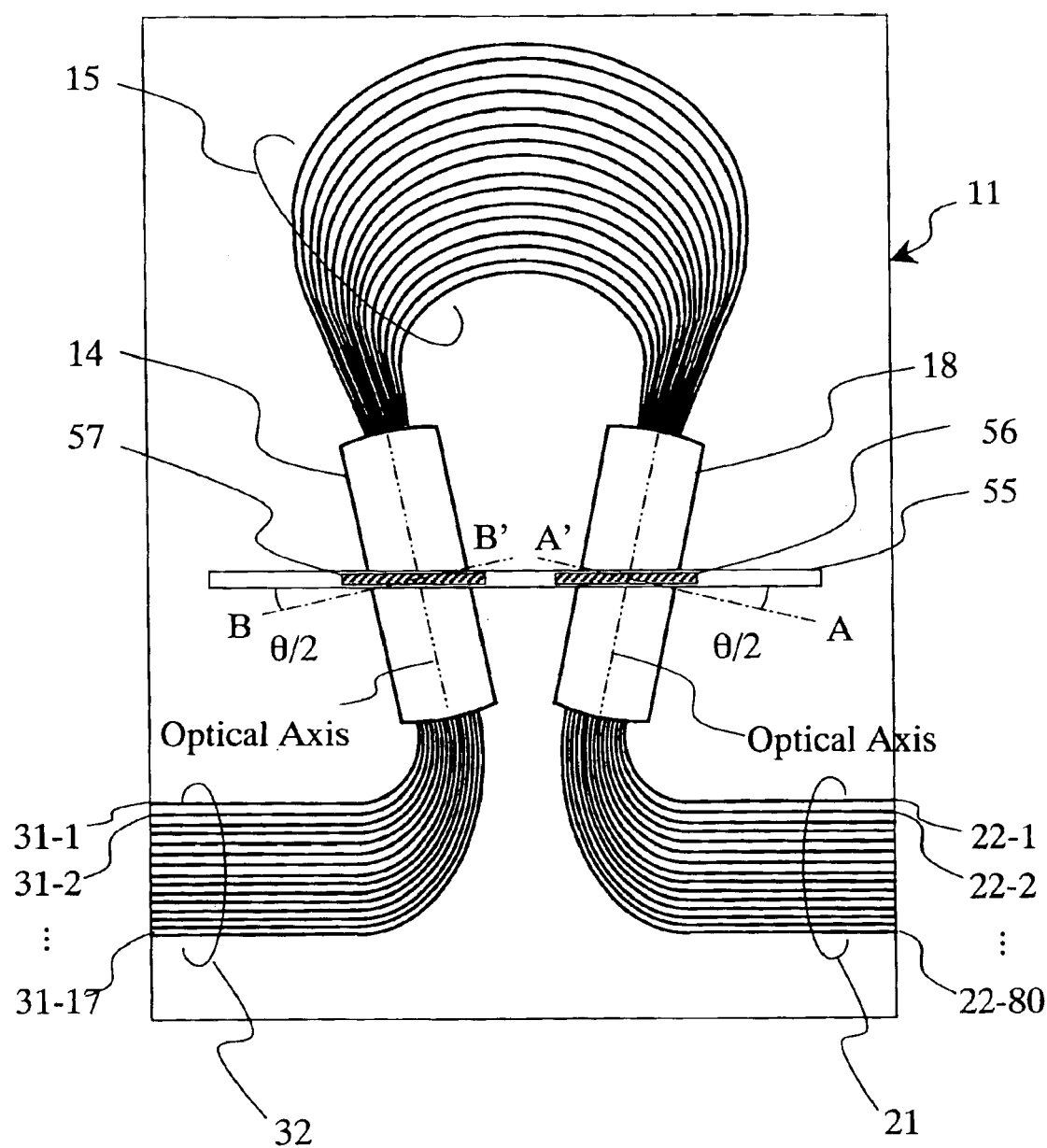
FIG. 14 is a schematic drawing for describing an embodiment of an array waveguide diffraction grating type optical multiplexer/demultiplexer in which the present invention is applied.

FIG. 14 shows an embodiment of an array waveguide diffraction grating type optical multiplexer/demultiplexer in which the fourth invention is applied to the third invention. The special feature of the present embodiment is a structure which also cancels the polarization dependence of the transmission center wavelength due to the waveguide birefringence of the array waveguide in addition to those of the input slab waveguide and the output slab waveguide by half-wave plates inserted in one common groove formed in the input slab waveguide and the output slab waveguide. A detailed description is given below with reference to the drawings.

The function of the array waveguide diffraction grating of the present embodiment is approximately the same as that of Embodiment 5 shown in FIG. 13, but in the present embodiment, in order to make it possible to form one groove 55 into which half-wave plates 56, 57 are inserted, the input slab 14 and the output slab 18 are arranged so that the angles formed by extended lines of the optical axes thereof forms θ given by Equation (11). When given this kind of structure, it is possible to insert the half-wave plates 57, 56 at inclines of the angle θ/2 from the line AA' which is perpendicular to the optical axis of the input slab waveguide 14, and the line BB' which is perpendicular to the optical axis of the output slab waveguide 18. The waveguide birefringences Ba, Bs used the values calculated in Embodiment 5. This is because if the waveguide structure and the manufacturing method are approximately the same, then the waveguide birefringences will also have approximately the same values.

The input port and output port dependences of the polarization wavelength shift of the array waveguide diffraction grating of the present embodiment were measured, and the output port dependence of the polarization wavelength shift was reduced to within ±0.01 nm for all the input ports.

From the above, it was confirmed that the array waveguide diffraction grating of the present embodiment cancels the polarization dependence of the transmission center wavelength due to the waveguide birefringence of the input slab waveguide, the output slab waveguide, and the array waveguide by the two half-wave plates inserted in the one groove, and operates satisfactorily as an optical demultiplexer which makes it possible to carry out fine adjustment of the demultiplexing wavelength.

Embodiment 7

Figure 15:
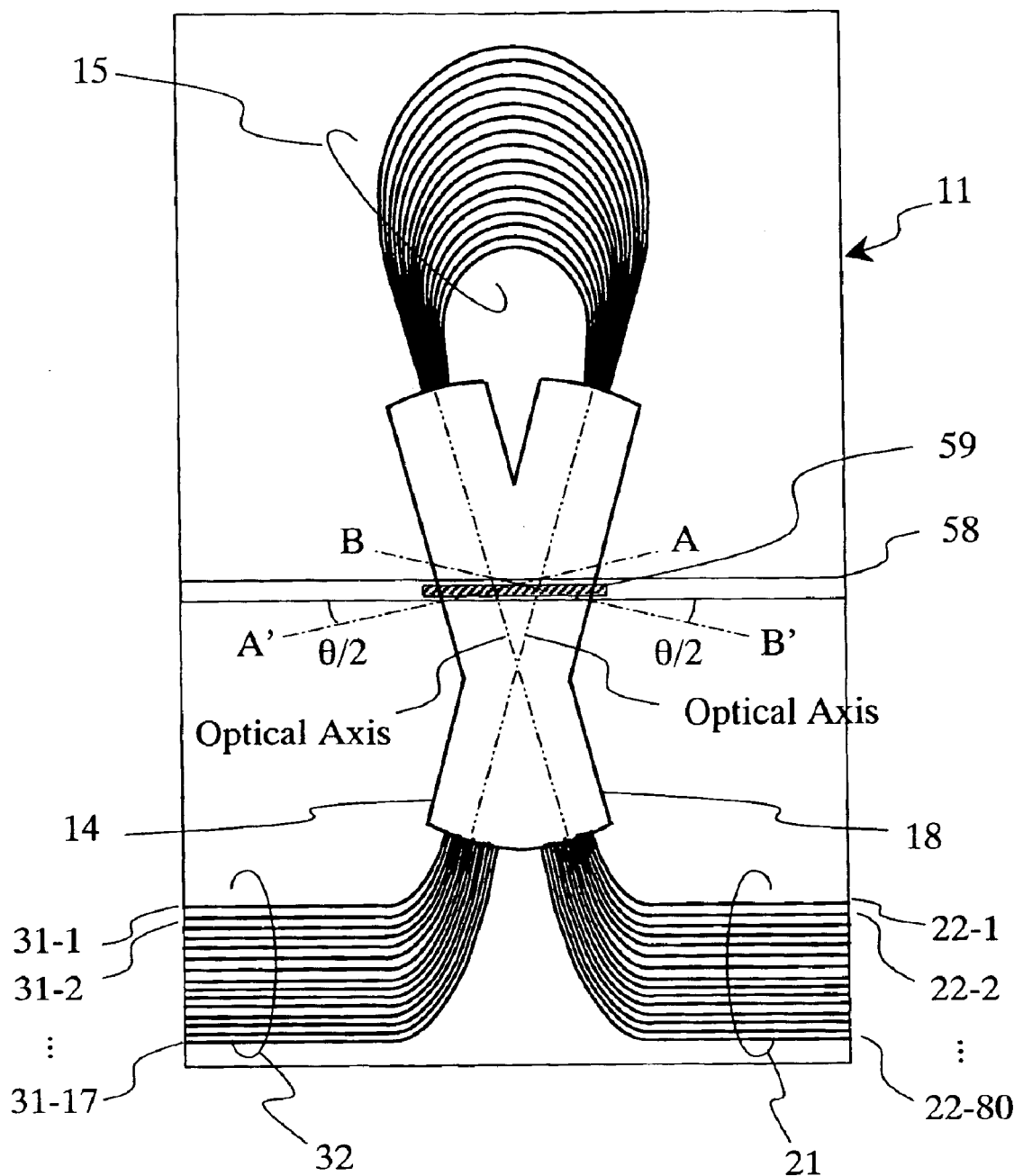
FIG. 15 is a schematic drawing for describing an embodiment of an array waveguide diffraction grating type optical multiplexer/demultiplexer in which the present invention is applied.

FIG. 15 shows an embodiment of an array waveguide diffraction grating type optical multiplexer/demultiplexer in which the fifth invention is applied to the third invention. The special feature of the present embodiment is a structure which also cancels the polarization dependence of the transmission center wavelength due to the waveguide birefringence of the array waveguide in addition to those of the input slab waveguide and the output slab waveguide by a common half-wave plate inserted in one common groove formed in the input slab waveguide and the output slab waveguide. A detailed description is given below with reference to the drawings.

The function of the array waveguide diffraction grating of the present embodiment is the same as that of Embodiment 6 shown in FIG. 14. In the present embodiment, the input slab waveguide 14 and the output slab waveguide 18 are arranged to intersect each other. When given the present structure, in addition to the fact that one groove 58 is sufficient, results are obtained with one half-wave plate 59 which cancels the polarization dependence of the transmission center wavelength. In contrast with the gap d of the array waveguide 15 being 15 μm at the connecting portion of the array waveguide 15 with the input slab waveguide 14 or the output slab waveguide 18 in Embodiment 6, in the present embodiment the gap d is reduced to 12 μm. For this reason, the angle θ becomes large, and in accordance with this, the intersecting angle of the input slab waveguide and the output slab waveguide can also be made large, and this makes it possible to easily manufacture the array waveguide diffraction grating type optical demultiplexer.

The polarization wavelength shifts of the output ports were measured for the input ports in the array waveguide diffraction grating of the present embodiment, and the polarization wavelength shift was within ±0.01 nm for all the input ports.

From the above, it was confirmed that the array waveguide diffraction grating of the present embodiment makes it possible to also cancel the polarization dependence of the transmission center wavelength due to the waveguide birefringence of the array waveguide in addition to those of the input slab waveguide and the output slab waveguide by one common half-wave plate inserted in the one common groove formed in the input slab waveguide and the output slab waveguide, and can operate satisfactorily as an optical demultiplexer which makes it possible to carry out fine adjustment of the demultiplexing wavelength.

The polarization mode converter according to the sixth invention was described in each of the embodiments. Further, in the embodiments described above, a polarization mode converter which depends on a half-wave plate made of polyimide was used, but the polarization mode converter is not limited to this, and may be a half-wave plate which uses crystal or another anisotropic material, or the polarization mode converter may be constructed by a stress imparting film such as amorphous silicon or the like formed on the waveguides.

The embodiments of an array waveguide diffraction grating type optical multiplexer/demultiplexer of the present invention were described above as examples of an optical multiplexer and an optical demultiplexer, but the array waveguide diffraction grating of the present invention can be applied to a wavelength router which is an optical multiplexer/demultiplexer having a plurality of input ports and a plurality of output ports, and which has a wavelength routing function between the input ports and the output ports.

Further, the array waveguide diffraction grating used in the present invention is not limited to being formed on a silicon substrate, and can be formed on silica glass, ceramic, plastic, or another semiconductor substrate. Further, the waveguide material is not limited to silica-based glass, and it is possible to construct a waveguide by an optical material such as a glass having other components, a plastic, a semiconductor or the like.

What is claimed is:

1. An array waveguide diffraction grating type optical multiplexer/demultiplexer, comprising:

at least one input channel waveguide, an input slab waveguide connected to said input channel waveguide, an array waveguide formed from a plurality of channel waveguides connected to said input slab waveguide, an output slab waveguide connected to said array waveguide, and at least one output channel waveguide connected to said output slab waveguide;

wherein a polarization mode converter is arranged in at least one of said input slab waveguide and said output slab waveguide.

2. The array waveguide diffraction grating type optical multiplexer/demultiplexer described in claim 1, wherein the array waveguide formed from a plurality of channel waveguides carries out means for canceling the polarization dependence due to the waveguide birefringence.

3. The array waveguide diffraction grating type optical multiplexer/demultiplexer described in claim 1, wherein said polarization mode converter is a means for canceling the polarization dependence due to the waveguide birefringence of said array waveguide, and the polarization dependence due to the waveguide birefringence of at least one of said input slab waveguide and said output slab waveguide.

4. The array waveguide diffraction grating type optical multiplexer/demultiplexer described in any one of claim 1, claim 2 or claim 3, wherein said polarization mode converter is provided in a common groove formed in said input slab waveguide and said output slab waveguide.

5. The array waveguide diffraction grating type optical multiplexer/demultiplexer described in any one of claim 1, claim 2 or claim 3, wherein said polarization mode converter is provided in common in said input slab waveguide and said output slab waveguide in an intersecting portion formed by intersecting said input slab waveguide and said output slab waveguide.

6. The array waveguide diffraction grating type optical multiplexer/demultiplexer described in any one of claim 1, claim 2 or claim 3, wherein said polarization mode converter is a half-wave plate having a main axis inclined at 45 degrees with respect to said waveguide substrate.

7. The array waveguide diffraction grating type optical multiplexer/demultiplexer described in claim 4, wherein said polarization mode converter is a half-wave plate having a main axis inclined at 45 degrees with respect to said waveguide substrate.

8. The array waveguide diffraction grating type optical multiplexer/demultiplexer described in claim 5, wherein said polarization mode converter is a half-wave plate having a main axis inclined at 45 degrees with respect to said waveguide substrate.

* * * * *